US011397527B2

(12) United States Patent
Kurihara et al.

(10) Patent No.: US 11,397,527 B2
(45) Date of Patent: Jul. 26, 2022

(54) APPLIANCES AND LIVING SPACES

(71) Applicant: RENESAS ELECTRONICS CORPORATION, Tokyo (JP)

(72) Inventors: Wataru Kurihara, Tokyo (JP); Takehiro Mikami, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 266 days.

(21) Appl. No.: 16/596,062

(22) Filed: Oct. 8, 2019

(65) Prior Publication Data

US 2020/0174674 A1 Jun. 4, 2020

(30) Foreign Application Priority Data

Dec. 3, 2018 (JP) .............................. JP2018-226227

(51) Int. Cl.
*G06F 3/06* (2006.01)
*G06F 16/635* (2019.01)
*G06F 3/041* (2006.01)

(52) U.S. Cl.
CPC .......... *G06F 3/0611* (2013.01); *G06F 3/0416* (2013.01); *G06F 16/636* (2019.01); *G06F 16/637* (2019.01)

(58) Field of Classification Search
CPC .... G06F 3/0611; G06F 16/637; G06F 16/636; G06F 3/0416
See application file for complete search history.

(56) References Cited

U.S. PATENT DOCUMENTS

| 7,821,382 B2 | 10/2010 | Kameyama | |
|---|---|---|---|
| 8,856,670 B1 * | 10/2014 | Thakur | G06F 9/451 |
| | | | 715/765 |
| 2014/0229848 A1 * | 8/2014 | Zhang | G06F 3/0484 |
| | | | 715/745 |

FOREIGN PATENT DOCUMENTS

| JP | 2000-148985 A | 5/2000 |
|---|---|---|
| JP | 2006-148357 A | 6/2006 |
| JP | 2009-023613 A | 2/2009 |
| JP | 2011-198170 A | 10/2011 |
| JP | 2012-150530 A | 8/2012 |
| JP | 2017-182133 A | 10/2017 |

OTHER PUBLICATIONS

Japanese Notice of Reasons for Refusal issued in corresponding Japanese Patent Application No. 2018-226227, dated Apr. 5, 2022, with English translation (8 pages).

* cited by examiner

*Primary Examiner* — Tammara R Peyton
(74) *Attorney, Agent, or Firm* — McDermott Will & Emery LLP

(57) ABSTRACT

It is an object of the present invention to provide a technique capable of performing user estimation without making the user aware of it. The appliance has a first sensor input unit that inputs a plurality of control commands for controlling an operation, and estimates the user based on the control command input to the first sensor input unit and an operation feature amount at the time of inputting the control command. The first sensor input unit includes a touch panel. The operation feature amount includes an operation position of the touch panel, an electrostatic capacitance value corresponding to a pressing of the touch panel, and a time-dependent change pattern thereof.

17 Claims, 23 Drawing Sheets

FIG. 22
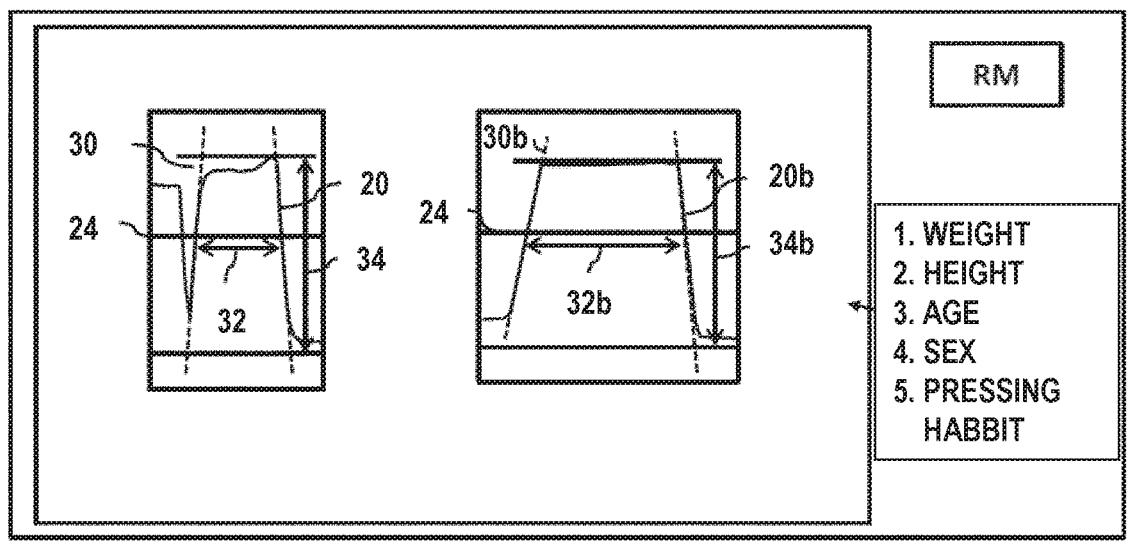
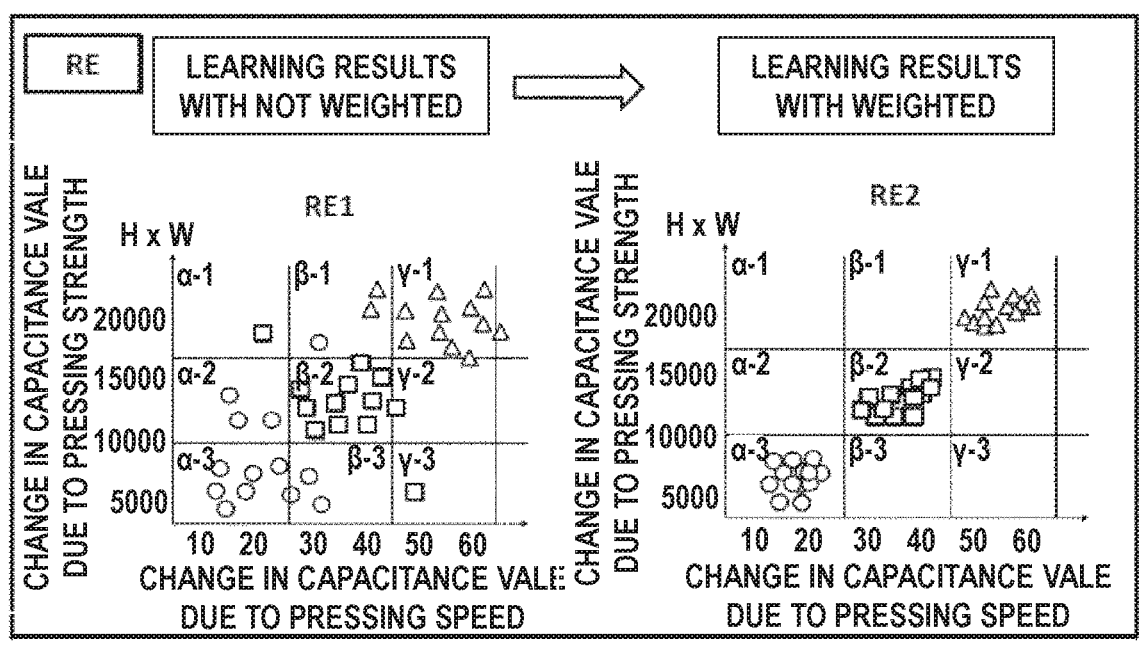

APPLIANCES AND LIVING SPACES

CROSS-REFERENCE TO RELATED APPLICATIONS

The disclosure of Japanese Patent Application No. 2018-226227 filed on Dec. 3, 2018 including the specification, drawings and abstract is incorporated herein by reference in its entirety.

BACKGROUND

The present disclosure relates to devices and living spaces.

As an example of a technology for acquiring user biometric information by facial cameras, retinal cameras, iris (iris) cameras, venous cameras, etc., Publication No. 2009-23613 has been proposed.

In addition, an example of a personal authentication system that utilizes multiple types of biometric information, such as facial images by cameras and voice prints by microphones, for personal authentication is proposed in Publication No. 2000-148985.

SUMMARY

Authentication and estimation of individual users are very useful information. On the other hand, systems that use cameras and biometric sensing (fingerprint authentication, retinal authentication, etc.) tend to be discouraged from the viewpoint of privacy protection and from the standpoint of cost of incorporation into final products.

When authentication is performed by a camera, it is necessary to intentionally turn and authenticate the face toward the camera. In addition, when the authentication by the camera is applied to the appliance or the housing equipment, the psychological burden of the user that it is always seen is very large.

Furthermore, in appliances and housing equipment, there are not so many cases in which the face is intentionally turned to the camera for face authentication during operation. In addition, appliances and housing equipment equipped with cameras for face authentication have not been introduced into the market.

In addition, when personal authentication is performed for the first time when the user uses the system, the user first needs to perform the work of "personal authentication" before performing a desired operation, and the user may feel troublesome.

It is an object of the present disclosure to provide a technique capable of performing personal estimation without making a user aware of it.

Other objects and novel features will become apparent from the description of this specification and the accompanying drawings.

An outline of representative ones of the present disclosure will be briefly described below.

That is, the appliance has a first sensor input unit capable of inputting a plurality of control commands for controlling an operation, and estimates a user based on a control command type of the control command input to the first sensor input unit and an operation feature amount when the control command is input.

According to the above-mentioned appliance, it is possible to perform personal estimation without making the user aware of it.

BRIEF DESCRIPTION OF THE DRAWINGS

FIG. 22 is a diagram illustrating a material and a result in machine-learning.

DETAILED DESCRIPTION

Figure 1:
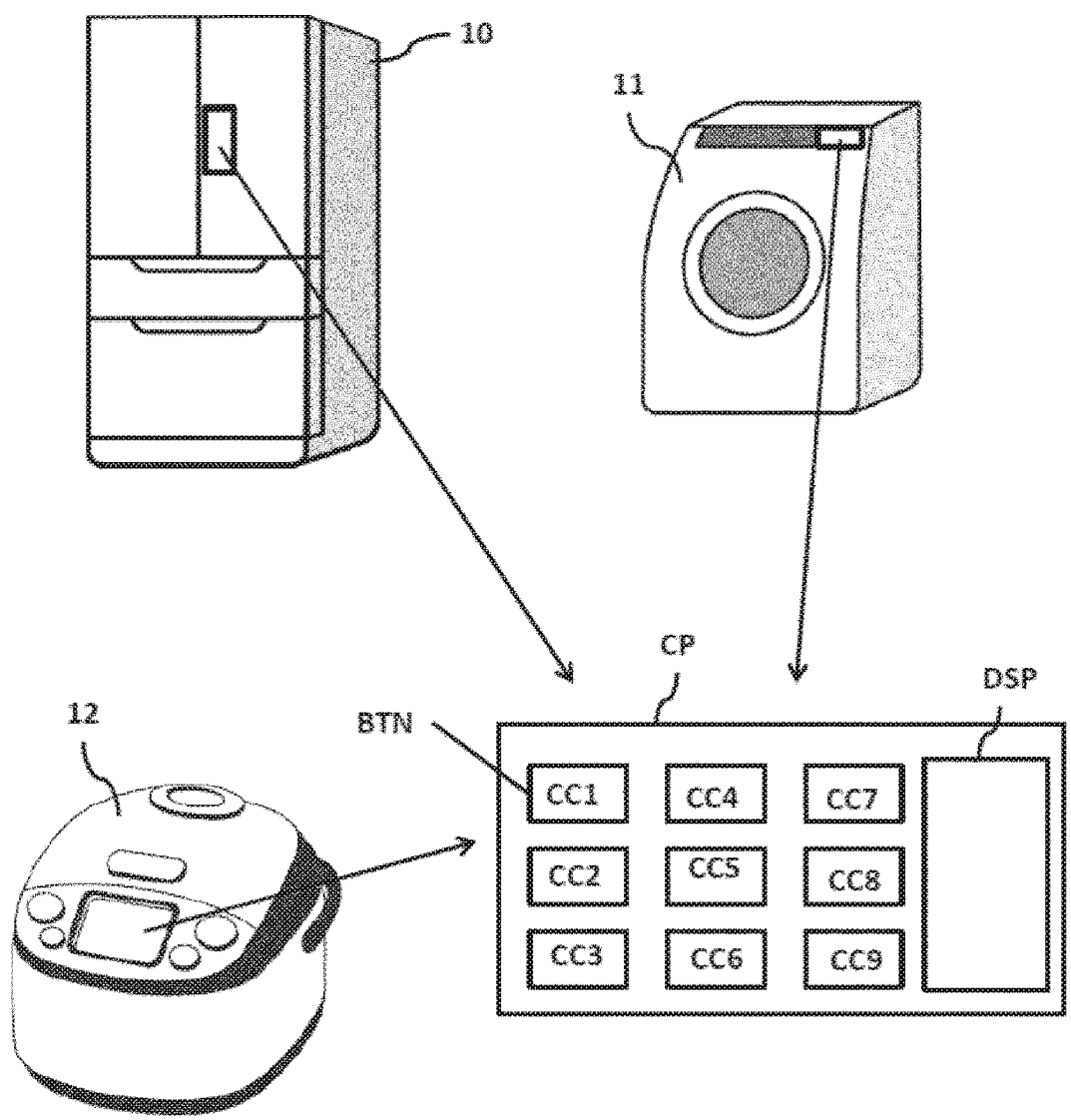
FIG. 1 is a diagram illustrating an appliance according to Embodiment 1.

Hereinafter, Embodiment will be described with reference to the drawings. However, in the following description, the same components are denoted by the same reference numerals, and a repetitive description thereof may be omitted. It should be noted that the drawings may be represented schematically in comparison with actual embodiments for the sake of clarity of explanation, but are merely an example and do not limit the interpretation of the present invention.

Embodiment 1

FIG. 1 is a diagram illustrating an appliance according to Embodiment 1. Generally, when operating an appliance or a housing equipment, a remote controller or a physical switch mounted on a main body of the appliance is used as a user interface. On the other hand, in some appliances and housing equipment, as a user interface to replace a physical switch, there has already been released an appliance equipped with an operation panel CP using a touch panel of an electrostatic capacitance type or a touch button of an electrostatic capacitance type. In this specification, the term "electrostatic capacitance touch" means "a touch panel of an electrostatic capacitance type" or "a touch button of an electrostatic capacitance type".

FIG. 1 exemplarily shows an operation panel CP provided in a refrigerator 10, a washing machine 11, and a rice cooker 12 as appliances. The operation panel CP includes a display unit DSP and a plurality of buttons BTNs for selecting control commands CC1~CC9 configured by an electrostatic capacitance touch. For example, when the user presses a button BTN corresponding to a control command CC1 from among a plurality of buttons BTN, the selected result is displayed as "CC1" on the display unit DSP. If the control command CC9 is a command meaning determination, pressing the button BTN corresponding to the control command CC9 causes the content of the control command CC1 to be executed.

Advantages of the operation panel CP using the electrostatic capacitance touch include ease of care due to the absence of unevenness, high durability due to low physical deterioration, and good design due to high design flexibility. From these viewpoints, in the future, standard installation of the operation panel CP by the electrostatic capacitance touch will be promoted more and more in the appliances and the housing equipment.

Figure 2:
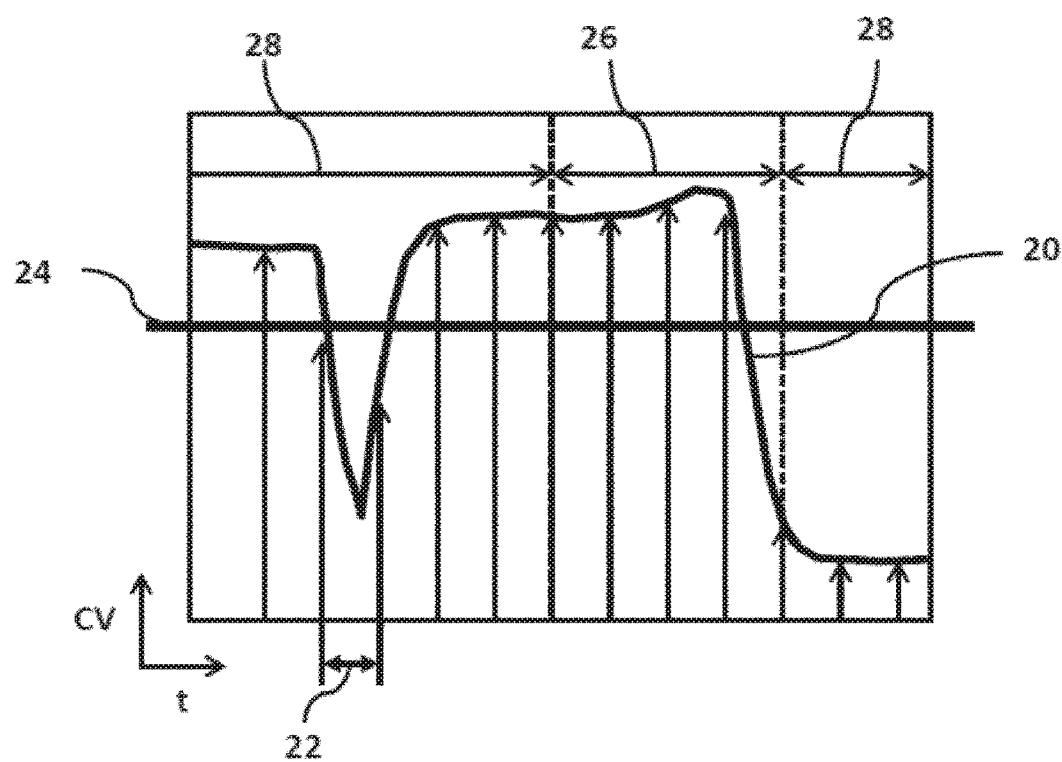
FIG. 2 is a diagram illustrating an exemplary determination of on/off of capacitance touches according to Embodiment 1.

FIG. 2 is a diagram illustrating an exemplary determination of on/off of the electrostatic capacitance touch according to the Embodiment 1. In the graph shown in FIG. 2, the vertical axis represents the electrostatic capacitance value CV, and the horizontal axis represents the time t. In the capacitance touch, the information of the electrostatic capacitance value 20 is used to determine whether or not the button BTN of the operation panel CP is pressed (on)/not pressed (off). In FIG. 2, the electrostatic capacitance value 20 is sampled every sampling state 22, and it is determined whether or not the electrostatic capacitance value 20 exceeds the threshold 24. In the example shown in FIG. 2, when the number of times exceeding the threshold 24 exceeds 3, it is determined that the time is "on (pressed)" period 26 thereafter, and after that, when the electrostatic capacitance value 20 is below the threshold value 24, it is determined that the time is "off (not pressed)" period 28. The waveform data of FIG. 2 is output in a graph form in order to visualize the change in the electrostatic capacitance value 20. In the case of an ordinary electrostatic capacitance touch, the determination is performed as a point instead of such a waveform in many cases.

Figure 3:
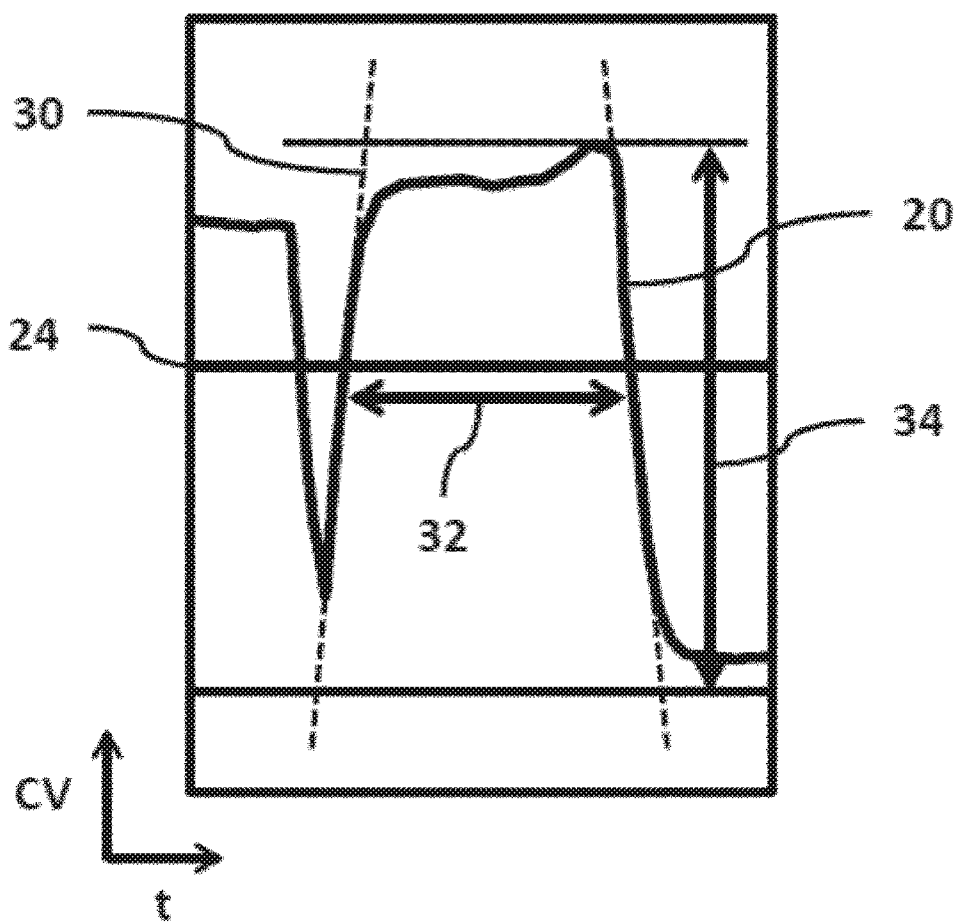
FIG. 3 is an example of waveform data when a user A presses a button with capacitance touch.
Figure 4:
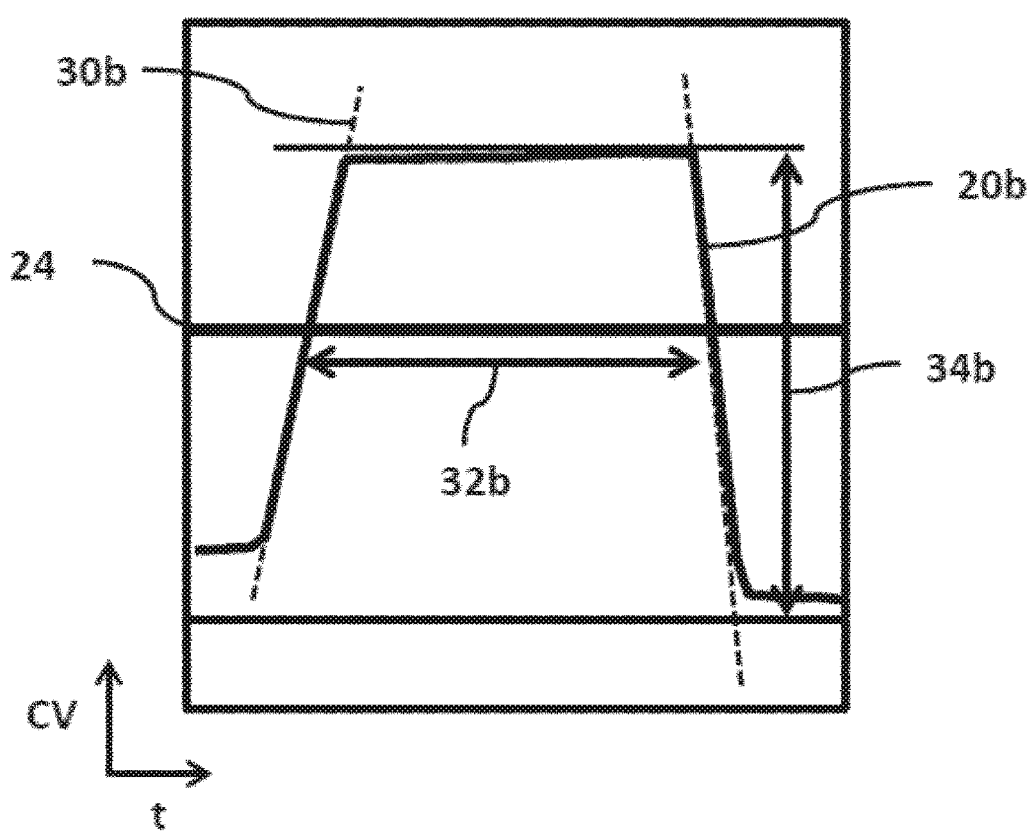
FIG. 4 is an example of waveform data when a user B presses a button with electrostatic capacitance touch.

Next, the difference in electrostatic capacitance value by the user will be described with reference to FIGS. 3 and 4. FIG. 3 is an example of waveform data when the user A presses a button by electrostatic capacitance touch. FIG. 4 shows an example of waveform data when the user B presses a button by electrostatic capacitance touch. When the user operates the appliance or the housing equipment, the user presses the button differently. At this time, the electrostatic capacitance value 20 measured by the electrostatic capacitance touch varies depending on the user (A, B) as shown in FIGS. 3 and 4.

In FIGS. 3 and 4, the slope 30 (30b) in the increasing direction of the electrostatic capacitance value 20 (20b), the width 32 (32b) of the interval in which the electrostatic capacitance value 20 (20b) exceeds the threshold 24, and the height 34 (34b) from the minimum value to the maximum value of the counting value are exemplified. In this case, the slope 30 is steep compared to the slope 30b (30>30b). Width 32 is narrow compared to width 32b (32<32b). The height 34 is higher compared to the height 34b (34>34b). The change in the electrostatic capacitance value 20 (20b) varies greatly depending on the habit of the user, such as the manner of pressing the button of the user (A, B), i.e. the strength of pressing the button, the position at which the button was pressed (operation position), and the like as well as the physical characteristics of the user (A, B), such as the body type, height, age, weight, and the like. The slopes 30 (30b), the widths 32 (32b) can be regarded as "operation feature amount" by which individual features appear. The operation feature amount includes an electrostatic capacitance value of a user of the appliance to ground.

In the above description, the slope 30 (30b), the width 32 (32b) have been described as an example, but when the electrostatic capacitance value 20 (20b) is viewed as one waveform data (a time-dependent change pattern), a change in the shape of the waveform data, a change in the slope, or the like can also be regarded as an "operation feature amount" in which an individual feature appears. That is, the operation feature amount includes the operation position of the touch panel (electrostatic capacitance touch panel), the electrostatic capacitance value corresponding to the pressing of the touch panel, and the time-dependent change pattern.

Figure 5:
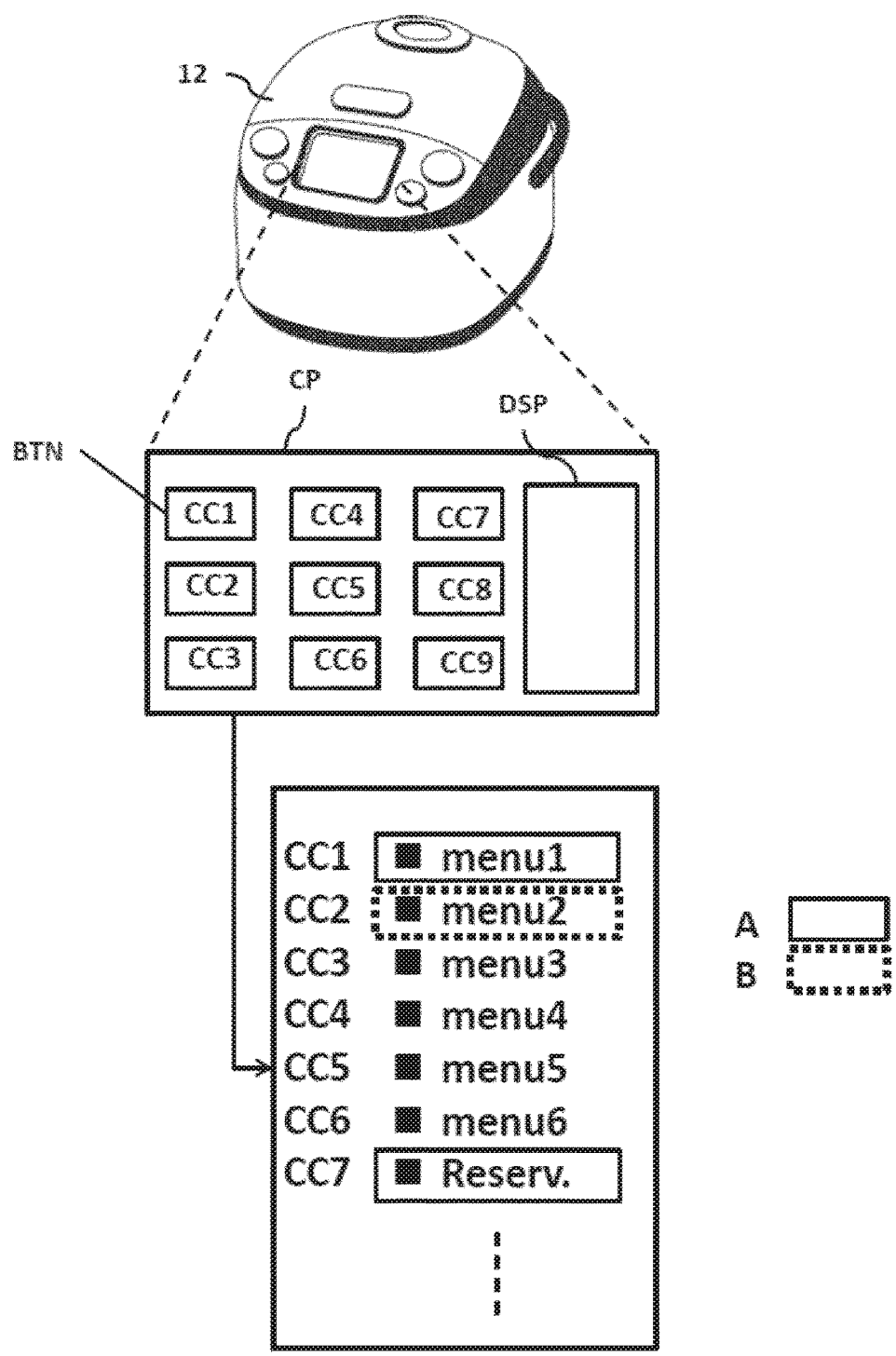
FIG. 5 is a diagram illustrating the difference in the control command type by the user.

Next, the difference of the control command type by the user will be described. In recent years, various control command types are available for appliances and housing equipment due to expansion and evolution of functions. The usage conditions and situations such as which control command type to use and when to use tend to be different for each user. FIG. 5 is a diagram illustrating the difference in the control command type by the user. In FIG. 5, the difference in the control command type by the user will be described by taking the operation of the operation panel CP of the rice cooker 12 as an example.

It is assumed that a plurality of buttons BTNs for selecting the control commands CC1~CC9 are provided on the control panel CP. It is assumed that, for example, menu1 to menu6 and reservation (Reserv.) are assigned to the buttons BTNs of the control commands CC1~CC7 respectively. Here, for example, it is assumed that the menu1 is "cook-in" and the menu2 is "fast-cooking-mode".

Among these, for example, a user A (e.g., a mother) tend to frequently use a control command CC1 that is "cook-in" to prepare for dinner and a control command CC7 that is "reserved" on the previous day to prepare for breakfast the following day. On the other hand, a user B (e.g., a daughter) tends to frequently use a control command CC2 that is "fast-cook" of the rice cooker 12 to prepare for dinner when the user A (her mother) is absent. As described above, there is a difference in the type of the control command (control command type) used depending on the difference between the users (A, B).

The usage history of the control command type is often stored in a database or the like via an appliance or a network and made into a data base. By simply recording the information, it is only known which control command is frequently used, and by adding the time information, it is only known which control command is frequently used in which time zone. In the example of FIG. 5, it is known that the "reservation" or the "fast-cooking-mode" was used, but it is not known which of the user A (mother) or the user B (daughter) used. However, as described with reference to FIG. 5, the control command type tends to differ depending on the user.

On the other hand, the electrostatic capacitance value 20 when the operation panel CP of the appliance is operated differs in the "operation feature amount" depending on the user (A, B), as described with reference to FIGS. 3 and 4.

Figure 6:
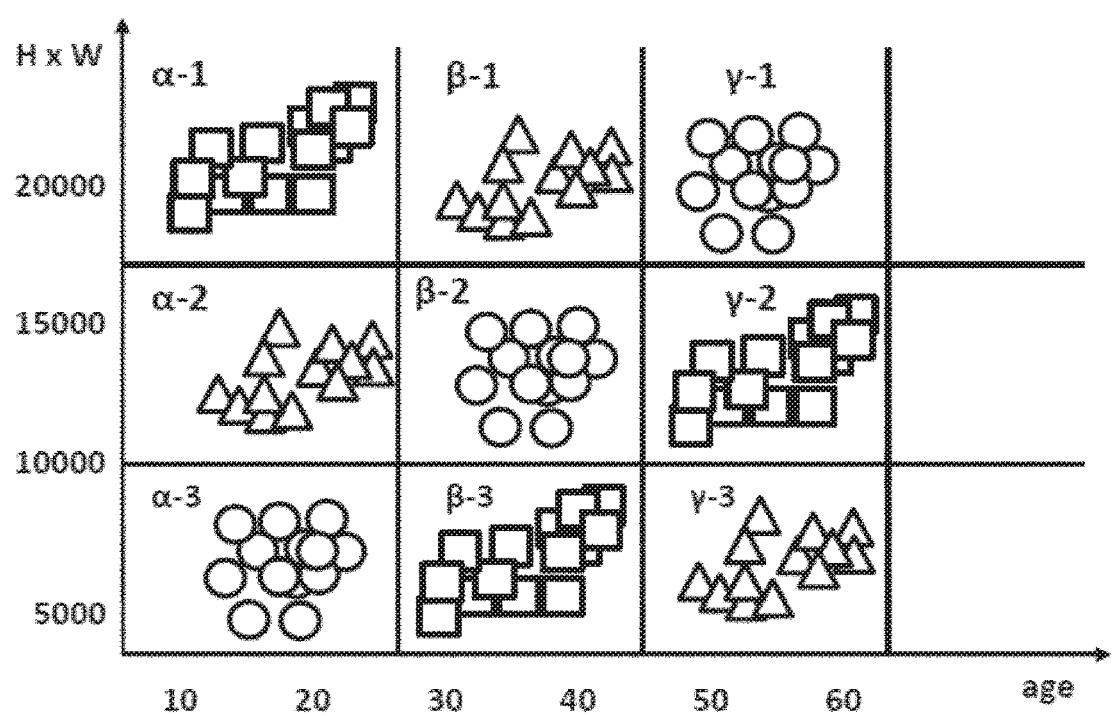
FIG. 6 is a distribution diagram illustrating an example of the distribution of changes in electrostatic capacitance values.

FIG. 6 is a distribution diagram illustrating an example of the distribution of changes in electrostatic capacitance values. As described above, the change of the electrostatic capacitance value 20 (20b) varies greatly depending on the user's habit such as the manner of pressing the button of the user (A, B), the strength of pressing the button, the position at which the button is pressed as well as the user's body type, the physical characteristics such as age and height, and the like. In FIG. 6, samples of changes in electrostatic capacitance values are obtained in advance from a plurality of persons, and the changes in electrostatic capacitance values are analyzed by FFTs (Fast Fourier Transformation) and the distributions of those analysis patterns are summarized as a map. In this distribution diagram, the vertical axis represents the height (H)×weight (W) value (H×W), and the horizontal axis represents the age (age). In this example, the map is divided into nine categories ($\alpha$-1 to $\alpha$-3, $\beta$-1 to $\beta$-3, and $\gamma$-1 to $\gamma$-3). As shown in FIG. 6, the change of the electrostatic capacitance value may be tabulated or learned in the dispersion state by using a plurality of samples in advance.

Figure 7:
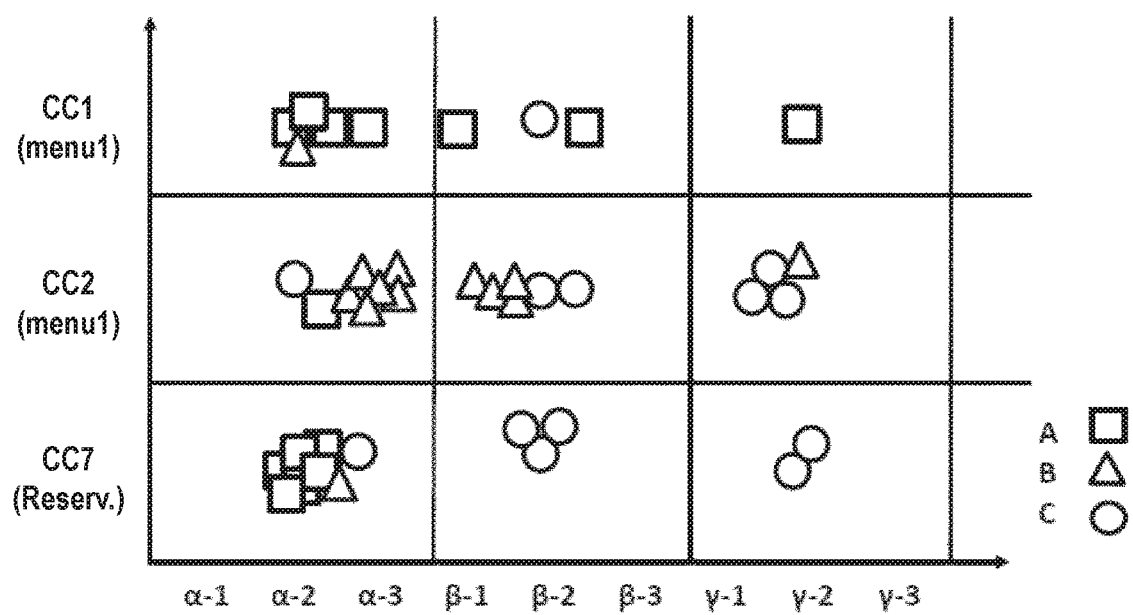
FIG. 7 is a diagram illustrating the relationship between the control command type and the classification of changes in electrostatic capacitance value.

FIG. 7 is a diagram illustrating the relationship between the control command type and the classification of the change in the electrostatic capacitance value. In FIG. 7, the analysis pattern obtained by analyzing the change in the electrostatic capacitance value using the FFT is classified using the control command type and the classification ($\alpha$-1 to $\alpha$-3, $\beta$-1 to $\beta$-3, $\gamma$-1 to $\gamma$-3) of the change in the electrostatic capacitance value. In FIG. 7, the vertical axis represents the control command type, i.e., the control commands CC1, the control commands CC2, and the control commands CC7 are exemplarily shown. The horizontal axis represents the nine categories ($\alpha$-1 to $\alpha$-3, $\beta$-1 to $\beta$-3, and $\gamma$-1 to $\gamma$-3) described in FIG. 6. Here, a square indicates the value of the user A, a triangle indicates the value of the user B, and a circle indicates the value of the user C. As described above, the two feature amounts of the control command type and the electrostatic capacitance value can be estimated/classified for the person who operated the target device by analysis using a technique such as FFT. Furthermore, if artificial intelligence (AI) or machine-learning is used, higher-precision individual estimation becomes possible.

Figure 8:
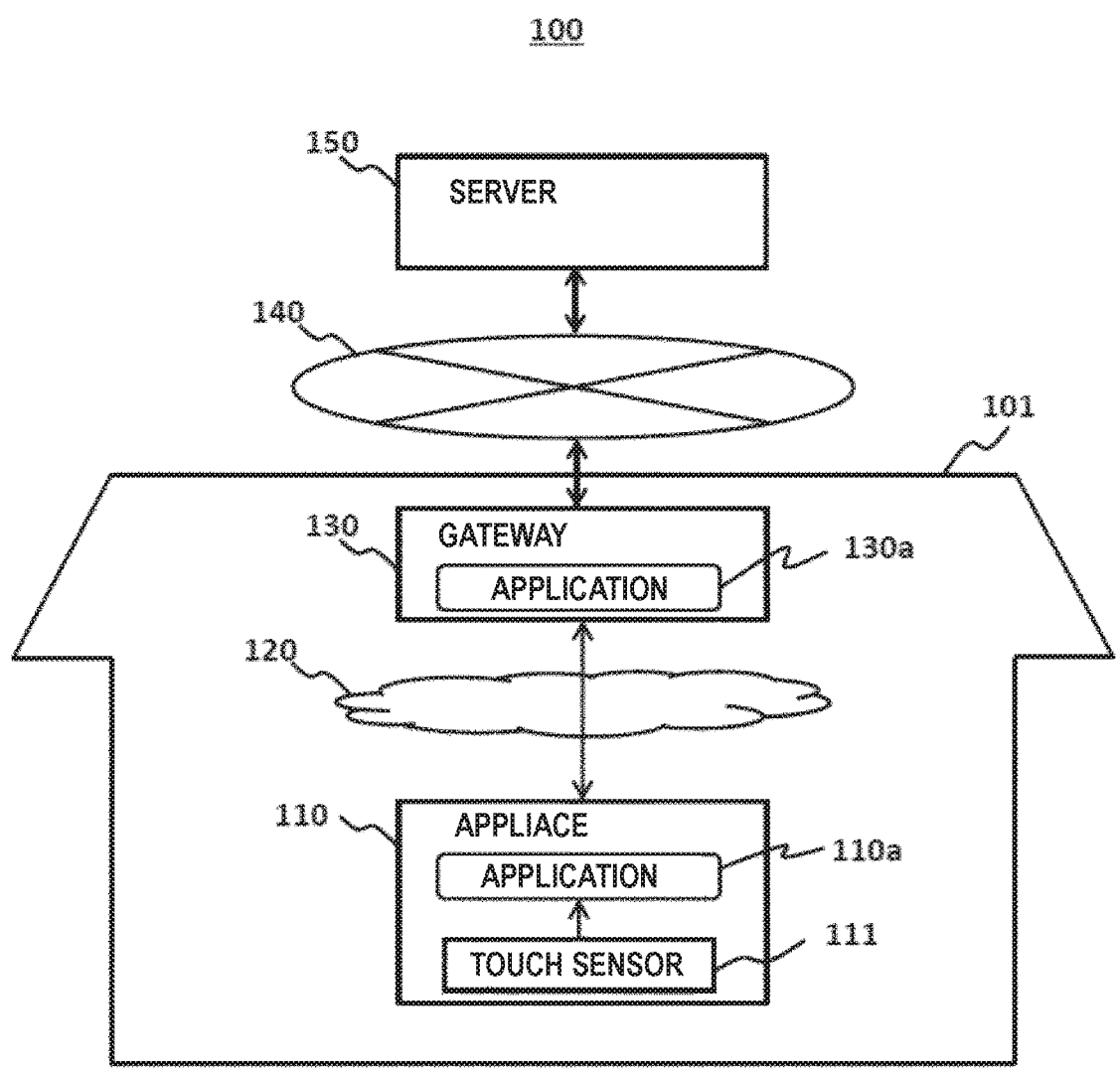
FIG. 8 is a diagram illustrating an exemplary configuration of a system according to a first embodiment of the present Embodiment.

FIG. 8 is a diagram illustrating an example of the overall configuration of the system according to the Embodiment 1. The system 100 includes an appliance 110 disposed in a living space 101, a gateway 130 for concentrating and distributing data with the appliance 110, and a server 150 including software for managing application programs incorporated in the gateway 130 and the appliance 110.

The appliance 110 includes the electrostatic capacitance touch sensor 111, and collects the change in the electrostatic capacitance value from the electrostatic capacitance touch sensor 111 and the input control command type as the operation feature amount OFV, and analyzes the information. The appliance 110 is coupled to the gateway 130 via the area network 120, and the gateway 130 collects data of the operation feature amount OFV from the appliance 110 coupled by the area network 120. The gateway 130 is coupled to the server 150 via an access network (IP network) 140. The application programs 130a and 110a of the gateway 130 and the appliance 110 are updated via the access network 140 and the area network 120.

In this example, the data of the operation feature amount OFV is transmitted to the server 150 via the gateway 130, but the present invention is not limited thereto. The data of the operation feature amount OFV may be stored as a database of the operation feature amount OFV only in the appliance 110, or may be stored as a database of the operation feature amount OFV from the appliance 110 to the gateway 130 via the area network 120.

Figure 9:
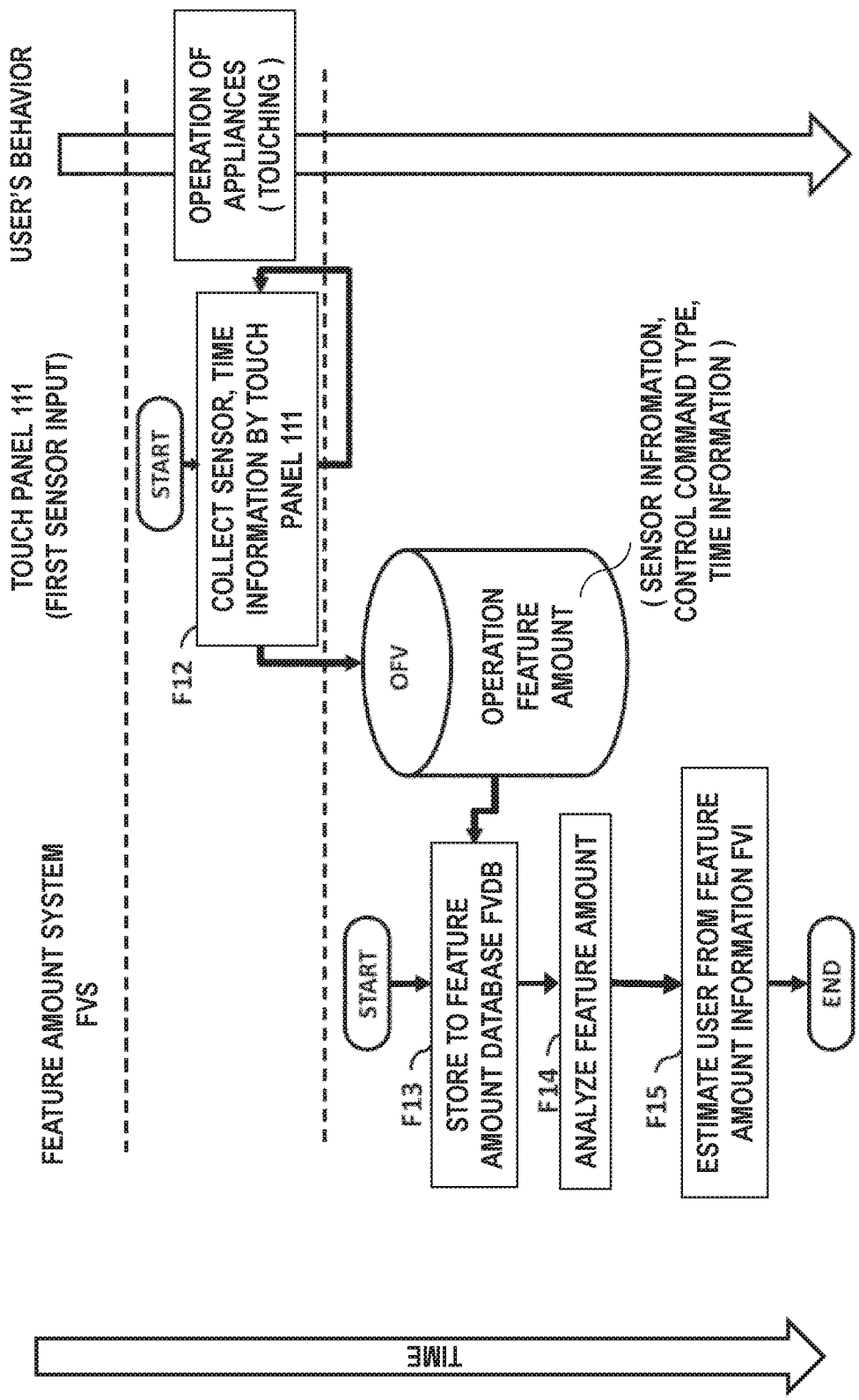
FIG. 9 is a diagram illustrating the estimation flows of individuals related to Embodiment 1.

FIG. 9 is a diagram illustrating an individual estimation flow according to Embodiment 1. The touch panel (first sensor input unit) in the figure shows an input from an electrostatic capacitance touch sensor 111 mounted on the appliance 110 in FIG. 8. The touch panel may be referred to as a first sensor input unit.

When the user operates the capacitance touch sensor 111 of the appliance 110, sensor information such as a change in the electrostatic capacitance value or a control command type due to the capacitance touch, and time information (time stamp or the like) indicating the time at which the capacitance touch is touched are acquired in step F12. The acquired data (sensor information, control command type, time information) is input to the feature amount system FVS (application program 110a in FIG. 8) mounted on the appliance 110 as data of the operation feature amount OFV.

In step F13, the feature amount system FVS stores the data of the operation feature amount OFV in the feature amount database FVDB. In step F14, the feature amount system FVS analyzes the feature amount of the operation feature amount OFV. In step F15, the feature amount system FVS estimates the user from the feature amount information FVI based on the result of the analysis, and ends the processing.

The estimated user information may be used for some service as the application program 110a of the appliance 110, or may be stored in the server 150 via the network 120 or 140 and used for other purposes.

As described above, the system of Embodiment 1 focuses on the operation panel using the electrostatic capacitance touch, which will become the standard in the future.

Individual identification using the personal identification systems described in the prior art requires additional operations when registering or manipulating information by the user (e.g., when fingerprinting, the user intentionally places his or her finger on the device, etc.). However, in the system of the present disclosure, registration of information is unnecessary, and even during operation, necessary data can be collected without being aware of the user.

Further, in the prior art, there are few cases in which the system is mounted on an appliance, and for example, when a similar system is implemented by fingerprint authentication, a fingerprint authentication device needs to be mounted on the appliance again, and the mounting of the fingerprint authentication device is costly. Further, in any of the authenticating methods, users need to consciously act on the dedicated device, and the mounting of the authentication device on the appliance involves unnaturalness. However, according to the configuration of the present disclosure, since the operation panel CP is used by the electrostatic capacitance touch in which the mounting of the operation panel CP is progressed in the future, the number of obstacles to the mounting of the operation panel CP is extremely small.

According to Embodiment 1, the following effects can be obtained. 1) Individual estimation is possible by using an operation panel using an electrostatic capacitance touch, which will be more mounted on appliances in the future. 2) Since the operation panel using the electrostatic capacitance touch mounted on the appliance is used for individual estimation, an increase in cost can be suppressed. 3) Since the operation panel using the electrostatic capacitance touch is used for the individual estimation, it is unnecessary to mount a high-cost function such as fingerprint authentication on the appliance. 4) The user does not need to be particularly aware of the individual estimation when operating the appliance. Since the information of the operation feature amount is collected unconsciously by the user, the user can finally receive the optimum service. 5) Since the camera is not used, it is possible to provide a privacy-friendly system.

Embodiment 2

In recent years, products in which a microphone is mounted for device control by voice recognition have been increasing. Moreover, products equipped with a voice recognition function by a microphone, such as an AI speaker, have also been installed in homes (living spaces). In Embodiment 2, in addition to the touch panel (first sensor input unit) of Embodiment 1, the microphone is used as the second sensor input, and the environmental sounds acquired from the microphone and the operation feature amounts OFVs (changes in electrostatic capacitance values and control command type) of Embodiment 1 are used to estimate individuals. The microphone may also be referred to as a second sensor input unit. From the microphone, sound information such as foot sound (sound, interval, etc.), sneezing, cough, etc. can be acquired as the environmental sound as the behavior feature amount BFV representing the feature of the individual.

Figure 10:
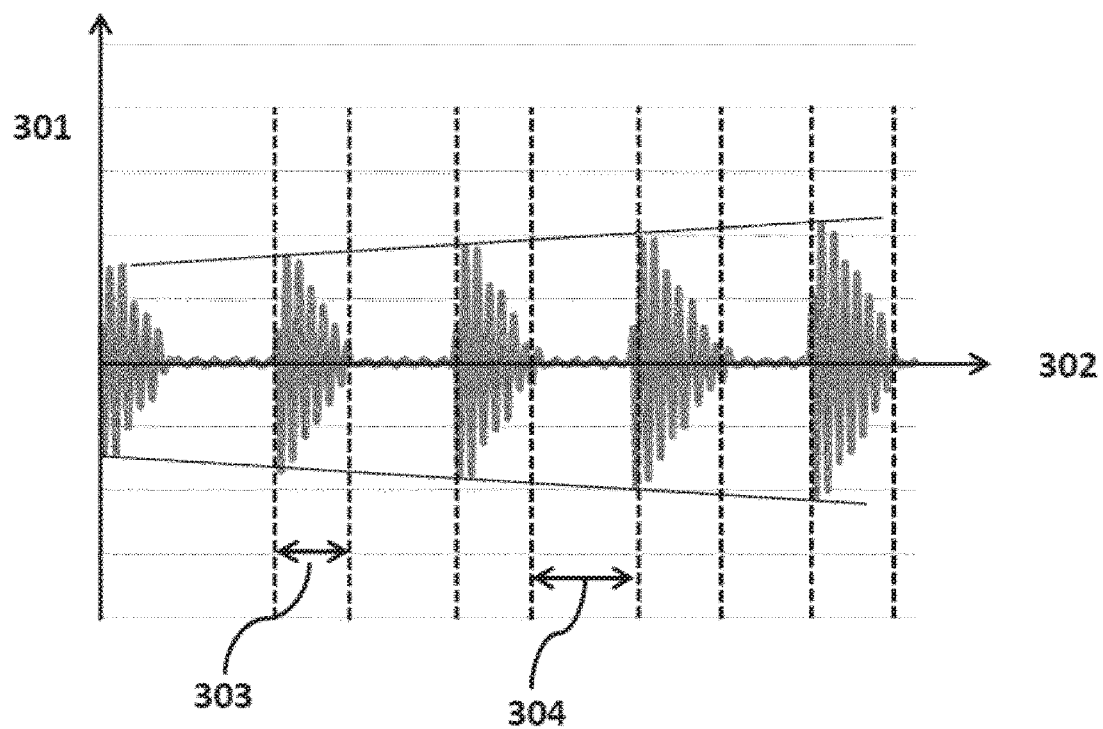
FIG. 10 is a diagram illustrating an example of an environmental sound (footsteps).

FIG. 10 is a diagram illustrating an example of environmental sounds (footsteps). As shown in FIG. 10, when focusing on foot sounds, the amplitude 301 of sounds, the walking speed and interval 304 based on the time axis 302, and the walking intensity 303 differ depending on the user. It can also be seen that as the amplitude 301 increases, the user is approaching the appliance on which the microphone is mounted. By combining the results of the analysis of the environmental sounds by FFTs and the like with the two feature amounts of the control command type and the electrostatic capacitance values in Embodiment 1, the users can be estimated more accurately.

Figure 11:
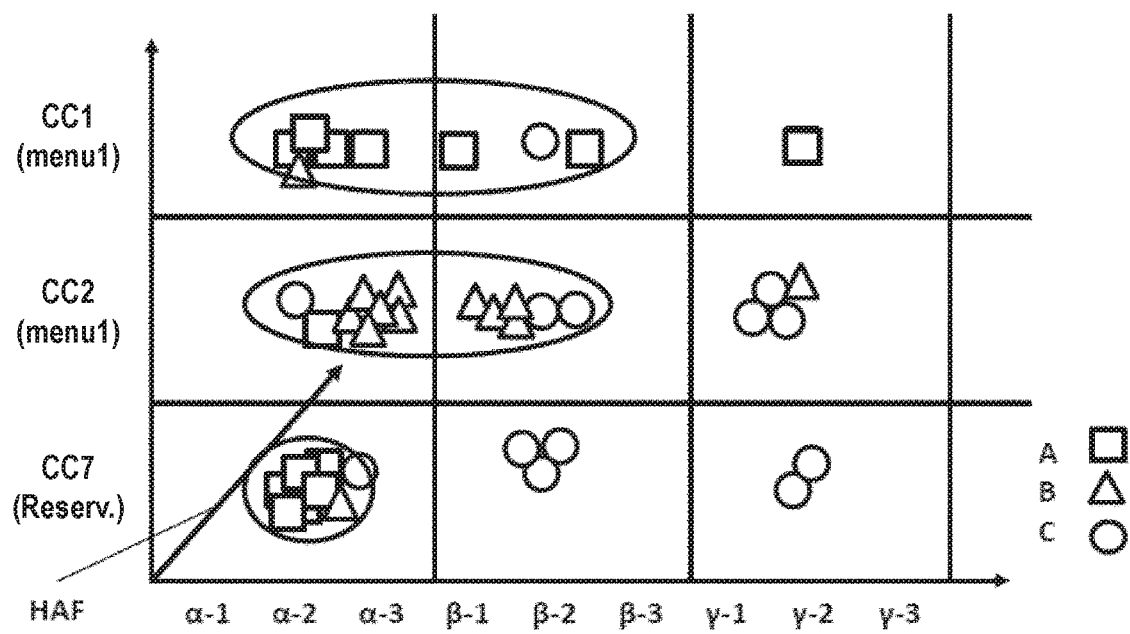
FIG. 11 is a diagram in which an FFT analysis pattern axis HAF of environmental sound information is added as a third axis.
Figure 12:
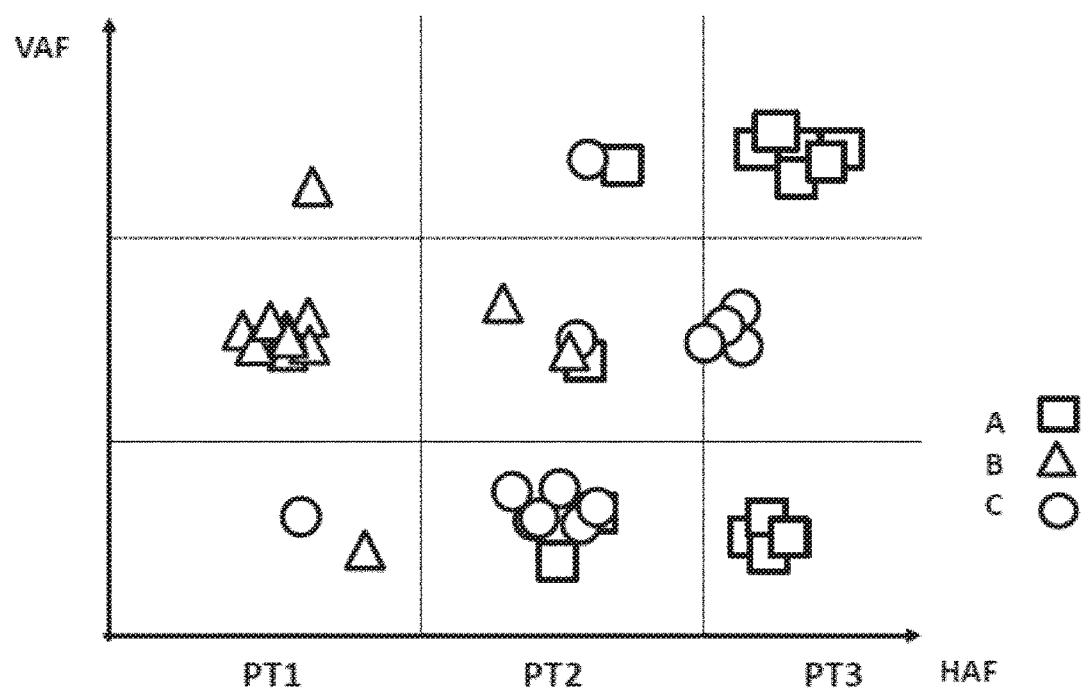
FIG. 12 is a diagram illustrating a case where the FFT analysis pattern axis HAF of the environmental sound information is viewed as the horizontal axis.

FIG. 11 is a diagram in which the FFT analysis pattern axis HAF of the environmental sound information is added to FIG. 7 as the third axis. FIG. 12 is a diagram illustrating a case where FIG. 11 is viewed from the FFT analysis pattern axis HAF of the environmental sound information as the horizontal axis. In FIG. 12, the vertical axis is an axis VAF showing the FFT analysis pattern of the change in the control command type and the electrostatic capacitance value. As described above, in this example, the trend of the user is grasped from the distribution diagram of FIG. 12, and individual estimation is possible.

Furthermore, before and after the device is operated, it is very likely that useful information is included for the individual estimation, such as the speed of walking closer/farther away. The FFT analysis method and the like are performed to analyze the information, and it is a very important factor which section is to be analyzed. Therefore, by combining with the information of the first sensor, it is possible to easily set a section such as 5 seconds before and after the operation time of the operation panel. With the microphone alone, it is necessary to analyze the whole period from the time when the sound information comes in to the time when the sound information disappears, or it is difficult to set from where to where the sound information is analyzed, but by combining the data with Embodiment 1 (linking the data with each other), the problem can be cleared and individual estimation with higher accuracy can be performed.

As described above, individual estimation is possible from the environmental sound information obtained from the second sensor (microphone). Repeating the estimation combined with Embodiment 1 (e.g., deep learning with AIs) enables individual estimation only from environmental sounds such as footsteps. For example, in FIG. 12, the FFT analysis pattern of the environmental sound information is classified into three patterns PT1, PT2, and PT3. Looking at the FFT analysis pattern of the environmental sound information, the user B can be estimated with a very high probability in the analysis pattern PT1. At this time, it is possible to guide or suggest an appropriate or recommended command type before the user inputs a command based on the estimated information of the user, the past control command type use history of the user, or the like.

Figure 13:
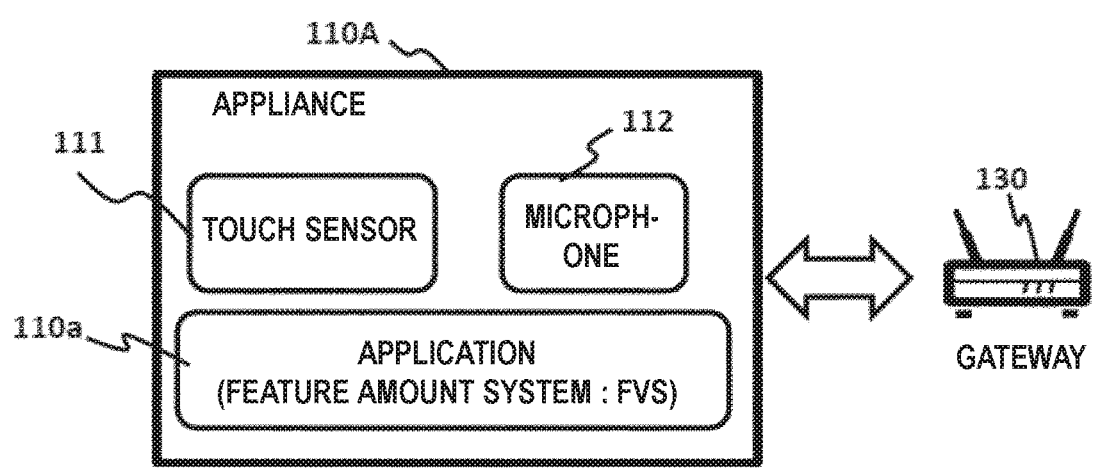
FIG. 13 is a diagram illustrating a configuration example 1 when a microphone is added.

Next, a configuration example when a microphone is added will be described with reference to FIGS. 13 to 15. FIG. 13 is a diagram illustrating a configuration example 1 when a microphone is added, FIG. 14 is a diagram illustrating a configuration example 2 when a microphone is added, and FIG. 15 is a diagram illustrating a configuration example 3 when a microphone is added.

In the configuration example 1 shown in FIG. 13, the appliance 110A includes an electrostatic capacitance touch 111, a microphone 112, and an application program 110*a* constituting the feature amount system FVS. The appliance 110A communicates with the gateway 130 as necessary.

Figure 14:
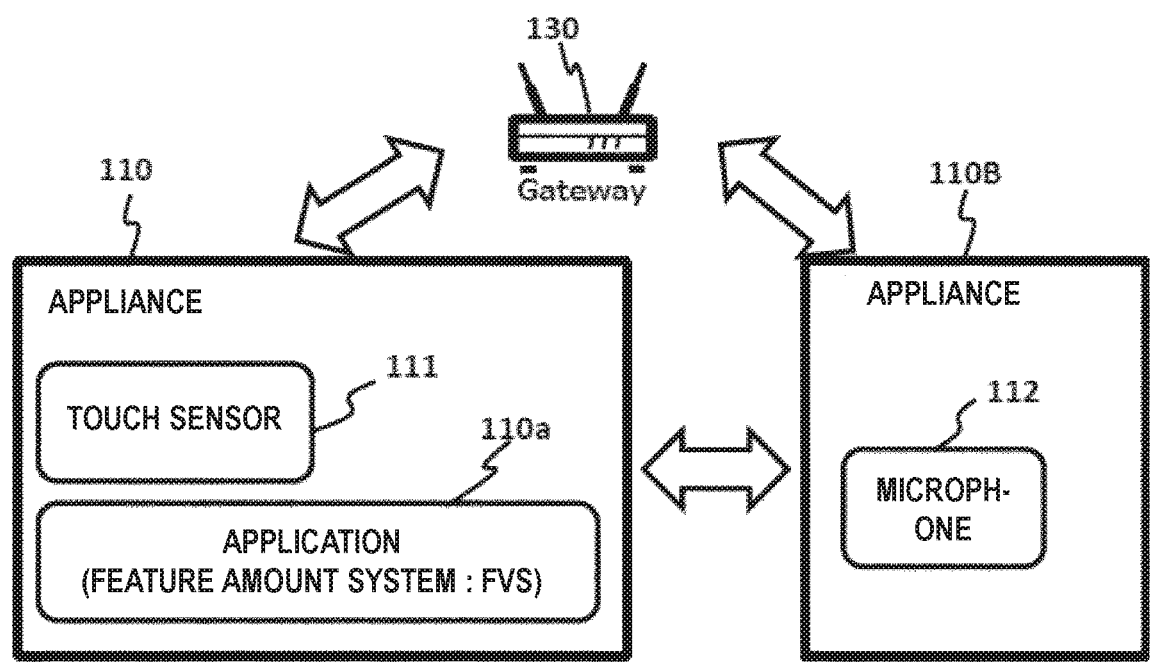
FIG. 14 is a diagram illustrating a configuration example 2 when a microphone is added.

In the configuration example 2 shown in FIG. 14, the appliance 110 includes the electrostatic capacitance touch 111 and the application program 110*a* constituting the feature amount system FVS, and the appliance 110B includes the microphone 112. The application program 110*a* of the appliance 110 receives the environmental sound information (behavior feature BFV) acquired by the microphone 112 of the appliance 110B, associates the received environmental sound information with the operation feature amount OFV of the electrostatic capacitance touch 111 by time stamp information or the like, and uses the information for individual estimation. The appliances 110 and 110B communicate with the gateway 130 as necessary.

Figure 15:
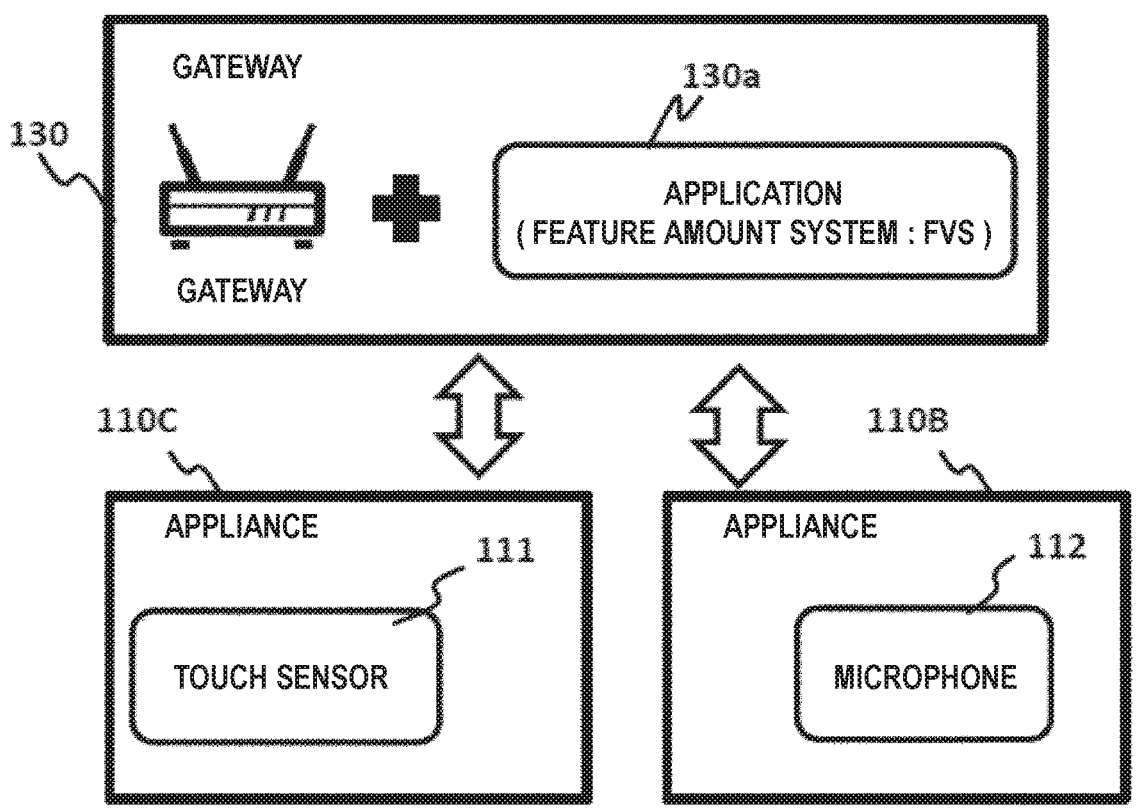
FIG. 15 is a diagram illustrating a configuration example 3 when a microphone is added.

The configuration example 3 shown in FIG. 15 includes an appliance 110C on which the electrostatic capacitance touch 111 is mounted, an appliance 110B on which the microphone 112 is mounted, and a gateway 130 on which the application program 130*a* constituting the feature amount system FVS is mounted. In this configuration, the application program 130*a* of the gateway 130 receives the operation feature amount OFV of the electrostatic capacitance touch 111 and the environmental sound information (behavior feature amount BFV) acquired by the microphone 112, and uses the information for individual estimation.

Figure 16:
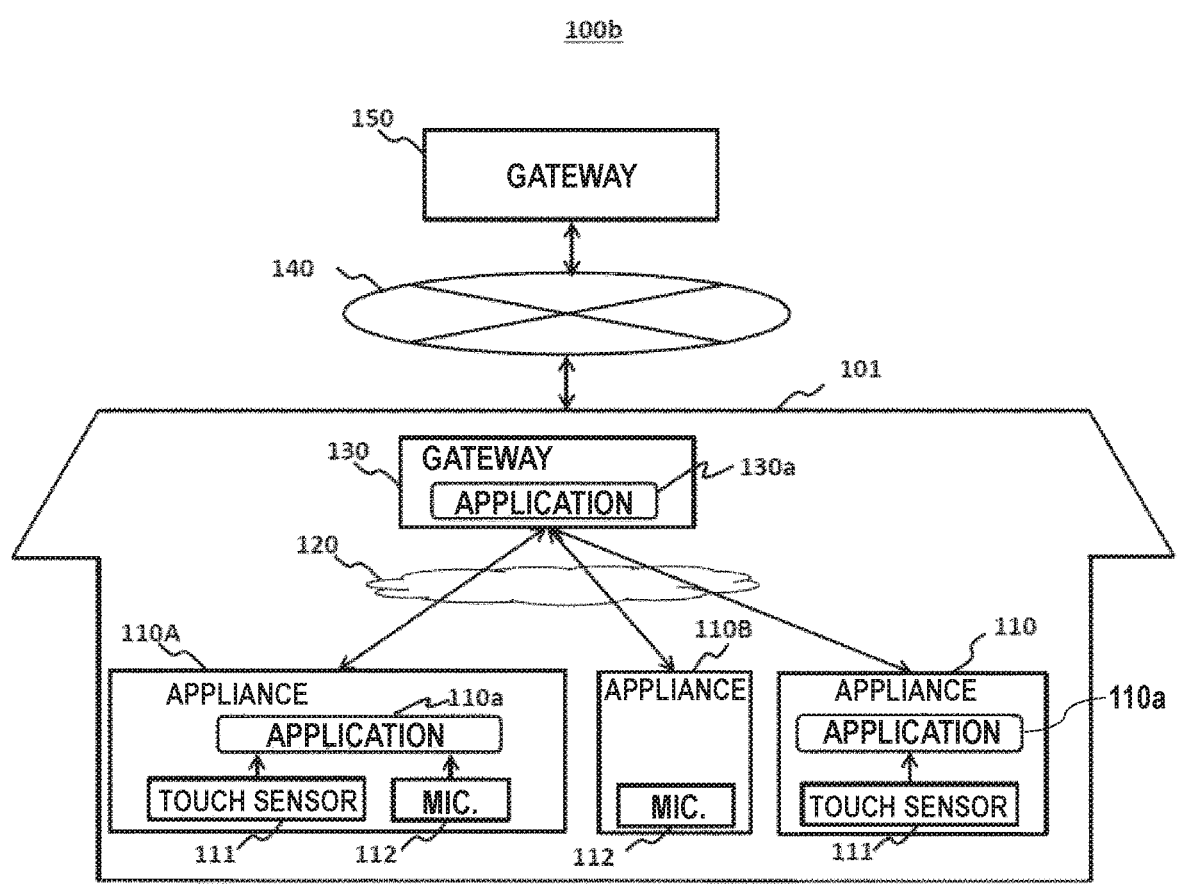
FIG. 16 is a diagram illustrating an exemplary overall configuration of a system according to Embodiment 2.

FIG. 16 is a diagram illustrating an exemplary overall configuration of a system according to Embodiment 2. The system 100*b* of FIG. 16 differs from that of FIG. 8 in that, in addition to the appliance 110, the appliance 110A including the microphone 112 is provided, and in that the appliance 110B including the microphone 112 is provided. The rest of the configuration is the same as that of FIG. 8, and a description thereof will be omitted.

The appliance 110B can be used as follows. For example, the environmental sound information collected by the microphone 112 of the appliance 110B is transmitted to the gateway 130 via the area network 120, and is used for individual estimation or the like in association with the feature amount data from the appliance 110.

The system 100b of FIG. 16 is not limited thereto, and may be configured as shown in FIG. 15, or may be configured by combining FIGS. 13 to 15.

Figure 17:
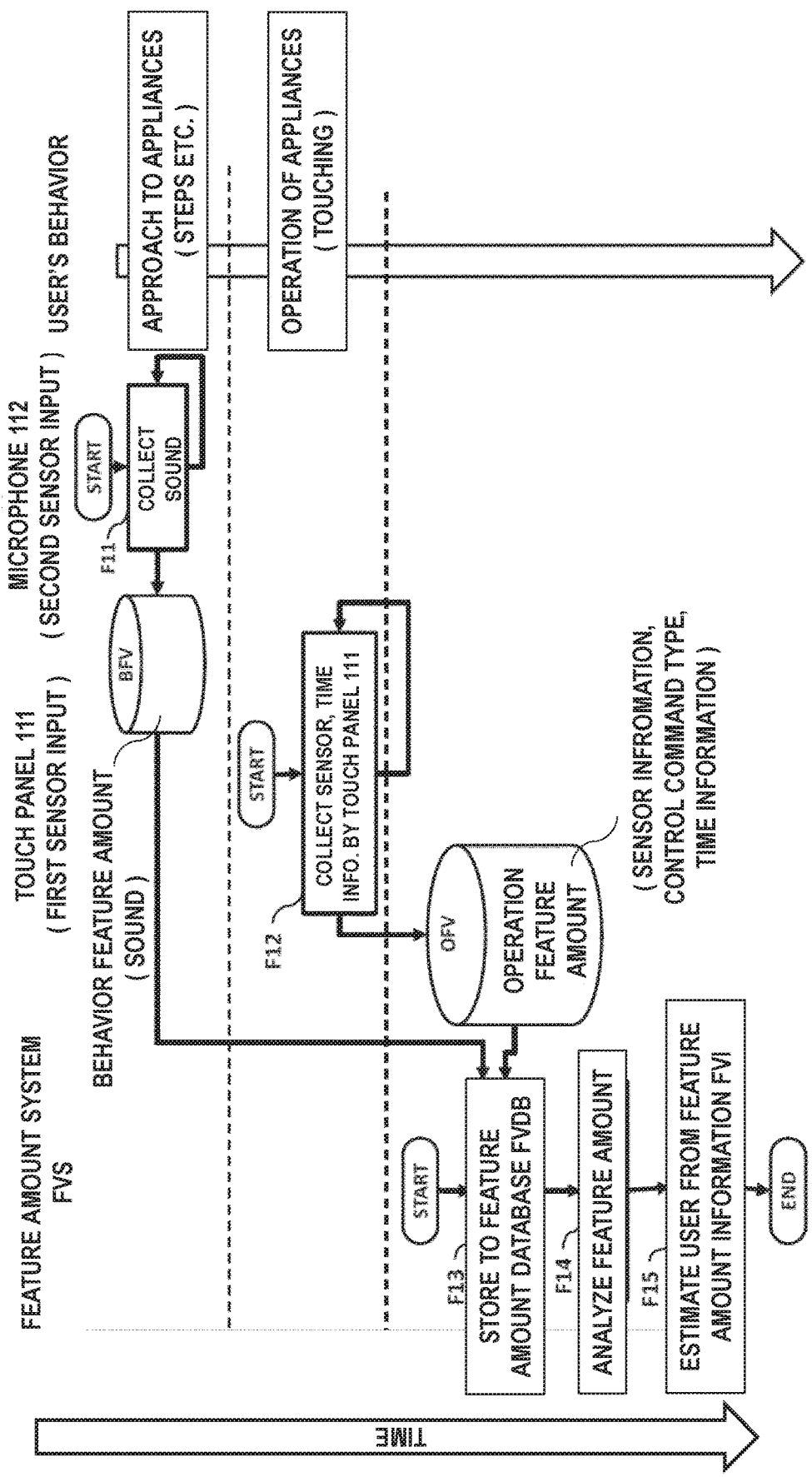
FIG. 17 is a diagram illustrating the estimation flows of individuals related to Embodiment 2.

FIG. 17 is a diagram illustrating an individual estimation flow according to Embodiment 2. The individual estimation flow shown in FIG. 17 is obtained by adding a microphone flow as a second sensor input to the personal estimation flow Embodiment 1 shown in FIG. 8.

In step F11, the sound information is collected by the microphone 112, and the environmental sound information is input as data of the behavior feature amount BFV to the feature amount system (application 110a in FIG. 16) mounted on the appliance 110. The environmental sound information may include time stamp information indicating the time at which the sound information was collected. The subsequent steps are the same as those in Embodiment 1. In this embodiment, the feature amount system FVS stores the data of the behavior feature amount BFV and the data of the operation feature amount OFV in the feature amount database FVDB in step F13. In addition, in step F14, the analysis described with reference to FIGS. 10 to 12 is performed on the feature amount database FVDB including the data of the behavior feature amount BFV and the data of the operation feature amount OFV. Thereby, in step F15, individual estimation is possible from the feature amount information FVI.

Further, since the sound information of the microphone 112 can be obtained prior to the touch operation of the operation panel CP, it is possible to estimate the user only by the sound information from the second sensor, and provide services such as proposal of a function frequently used by the estimated user in usual, display of an advertisement related to the action, and the like.

Figure 18:
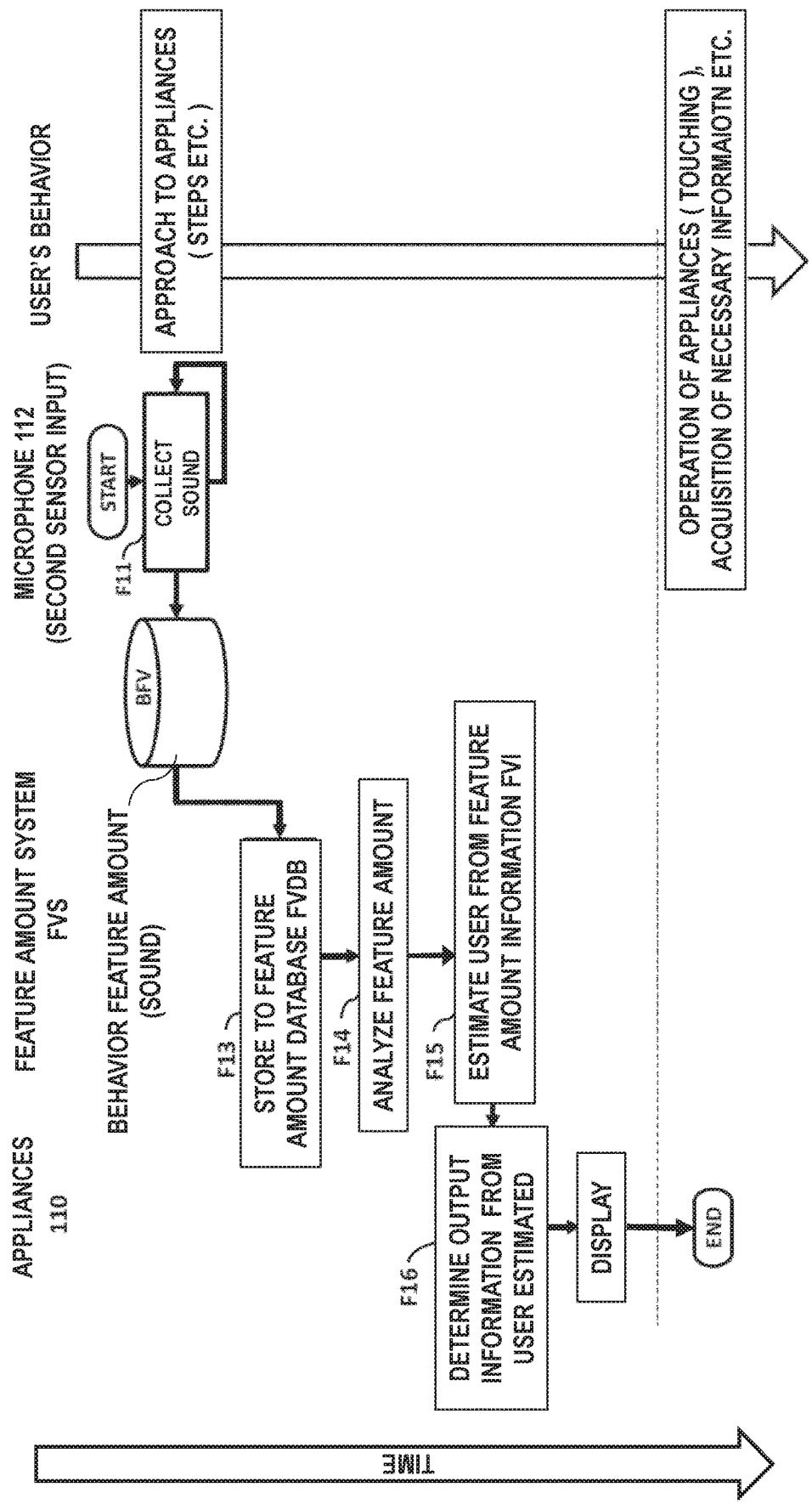
FIG. 18 is a diagram illustrating the estimation flows of individuals using only microphones related to Embodiment 2.

FIG. 18 is a diagram illustrating an individual estimation flow using only the microphone according to Embodiment 2. The flow up to the user estimation in step F15 is the same as the flow described with reference to FIG. 17. In this embodiment, the feature amount system FVS stores the data of the behavior feature amount BFV in the feature amount database FVDB in step F13. In addition, in step F14, the feature amount database FVDB including the data of the behavior feature BFV is analyzed using the FFT or the like as described with reference to FIG. 10. Thereby, in step F15, individual estimation is possible from the feature amount information FVI.

As shown in FIG. 18, in step F16, the appliance 110 receives the user information estimated in step F15, and displays output information suitable for the user on the display unit DSP. Here, the output information suitable for the user corresponds to, for example, a frequently used mode, display of a button corresponding to a frequently used control command or blinking of the button, or information that the user would like. That is, the control command type corresponding to the estimated user is guided (displayed) in advance on the display unit DSP before the estimated user starts inputting the control command to the first sensor input unit (touch panel) based on the operation feature amount and the control command type of the user.

Further, by accumulating the past use history of the device and the like of the individual in the history database, it is also possible to provide an optimal service (proposal of a function frequently used in usual, display of an advertisement related to the action, and the like) for the estimated user based on the history database. The historical database may be stored, for example, on the server 150.

According to Embodiment 2, the following effects can be obtained in addition to the effects of Embodiment 1. 1) By using the operation time of the first sensor (electrostatic capacitance touch) as a reference, it is possible to easily extract sound information before and after the second sensor (microphone) is to be intensively analyzed. For example, in 5 seconds before and after the operation time at which the electrostatic capacitance touch is operated, sound information including the feature amount of the operator can be obtained. 2) Since the environmental sound information by the second sensor input (microphone) comes before the operation information of the first sensor, it is possible to perform individual estimation based on the information from the second sensor, and to provide an optimum service (proposal of a function frequently used in usual, display of an advertisement related to the action, etc.) for the individual based on the past device use history of the individual, etc.

Embodiment 3

Embodiment 3 relates to a system for classifying and estimating residents from "operation features" from a plurality of appliances in a smart home environment (residential space) in which a plurality of appliances related to Embodiment 1 and Embodiment 2 are provided/used, and the system utilizes the estimated information.

Figure 19:
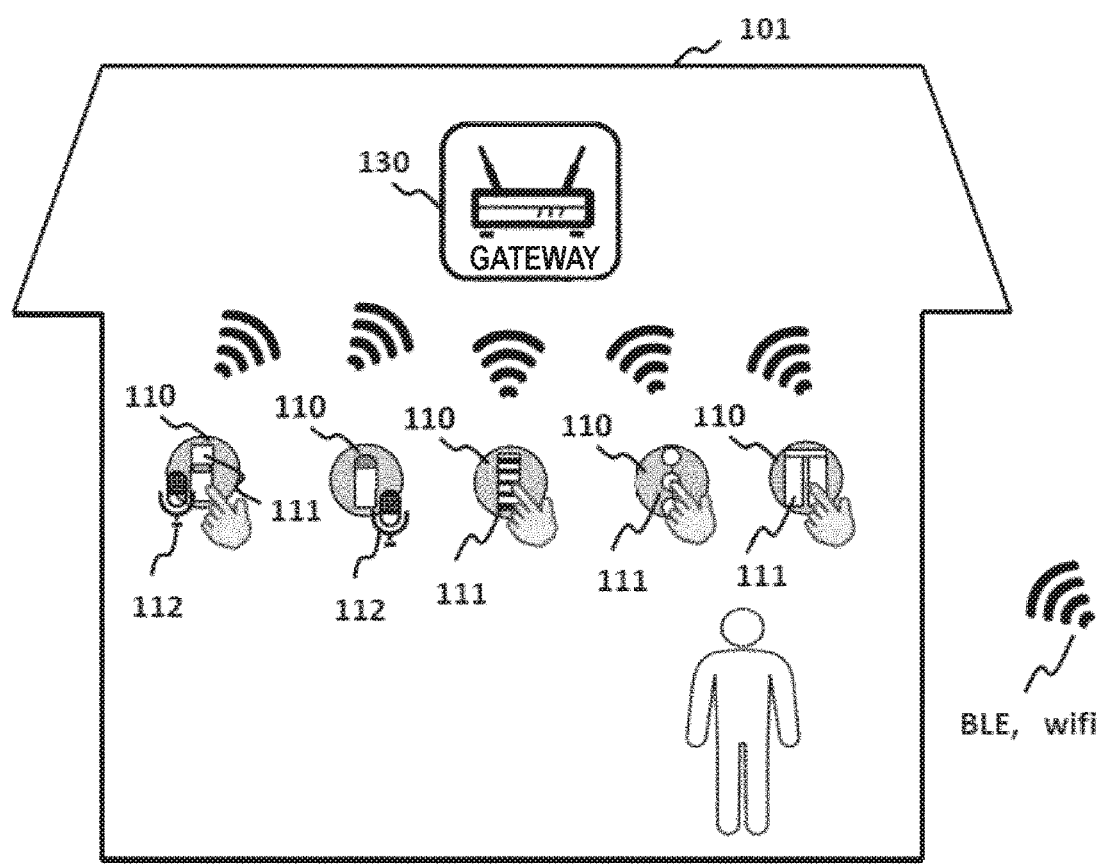
FIG. 19 is a conceptual diagram illustrating living spaces according to Embodiment 3.

FIG. 19 is a conceptual diagram showing a living space according to the Embodiment 3. As shown in FIG. 19, in future living spaces such as smart homes, there will be an increasing number of products 110 on which the operation panel CP using the electrostatic capacitance touch 111 is mounted, products 110 on which the microphone 112 and the speech recognition function are mounted, and products 110 on which the operation panel CP and the microphone 112 are mounted, which can realize Embodiment 1 and Embodiment 2. Here, the device 110 includes an appliance, a cooked appliance, a housing equipment, or the like.

Sensor information (changes in electrostatic capacitance values, control command types, environmental sounds) measured by the respective devices 110 are temporarily stored in the respective devices 110 as shown in FIGS. 8 and 16, or immediately transmitted to the gateways 130 via networks such as BLEs (Bluetooth (registered trademark) Low Energy) and the WiFi, and the feature amounts are made into databases and used for analysis/individual classification. At this time, the accumulation and analysis (data mining, deep learning, etc.) of the individual estimation information obtained by the plurality of devices 110 makes it possible to estimate the configuration of the resident in the target living space 101 and the behavior pattern of each resident.

For example, in the case of a situation in which "in the morning, a mother is making breakfast in kitchen," the user is presumed to be the user A based on the operation information A on the cooking appliance 110 (such as a rice cooker or an IH (Induction Heating) cooker) and the footnote A as well as the time stamp information. Although, at this time, the user A is not known to be the mother. When this estimation is accumulated, it is possible to provide a service such as providing a recommendation menu for the following morning from the appliance 110 when the information of the footnote A is obtained in the evening of the previous day. This is an example of providing information by estimating a behavior pattern in which the user A is making breakfast every morning and using the information.

In addition, the present invention is not limited to the appliance 110 of cooking, and can also be used for operation control of other appliances provided in the living space by using the configuration of the resident and the behavior pattern information of each person. For example, consider a situation in which the father picks up beer from the refrigerator (110) at night after returning home from the company and watches the television (110) in the living room. In this case, it is possible to provide a service of estimating the user B from the opening and closing of the door of the refrigerator (110) (the electrostatic capacitance touch 111 is mounted on the handle portion) and the time stamp information, and starting the air conditioner (110) and the television (110) of the living room simultaneously with the detection from the behavior pattern of the user B. That is, it is possible to estimate the behavior pattern of the user B and control the operation of the other appliances 110 and the housing equipment. Here, appliances such as the air conditioner (110) and the television (110) correspond to other appliances with respect to the refrigerator (110).

Figure 20:
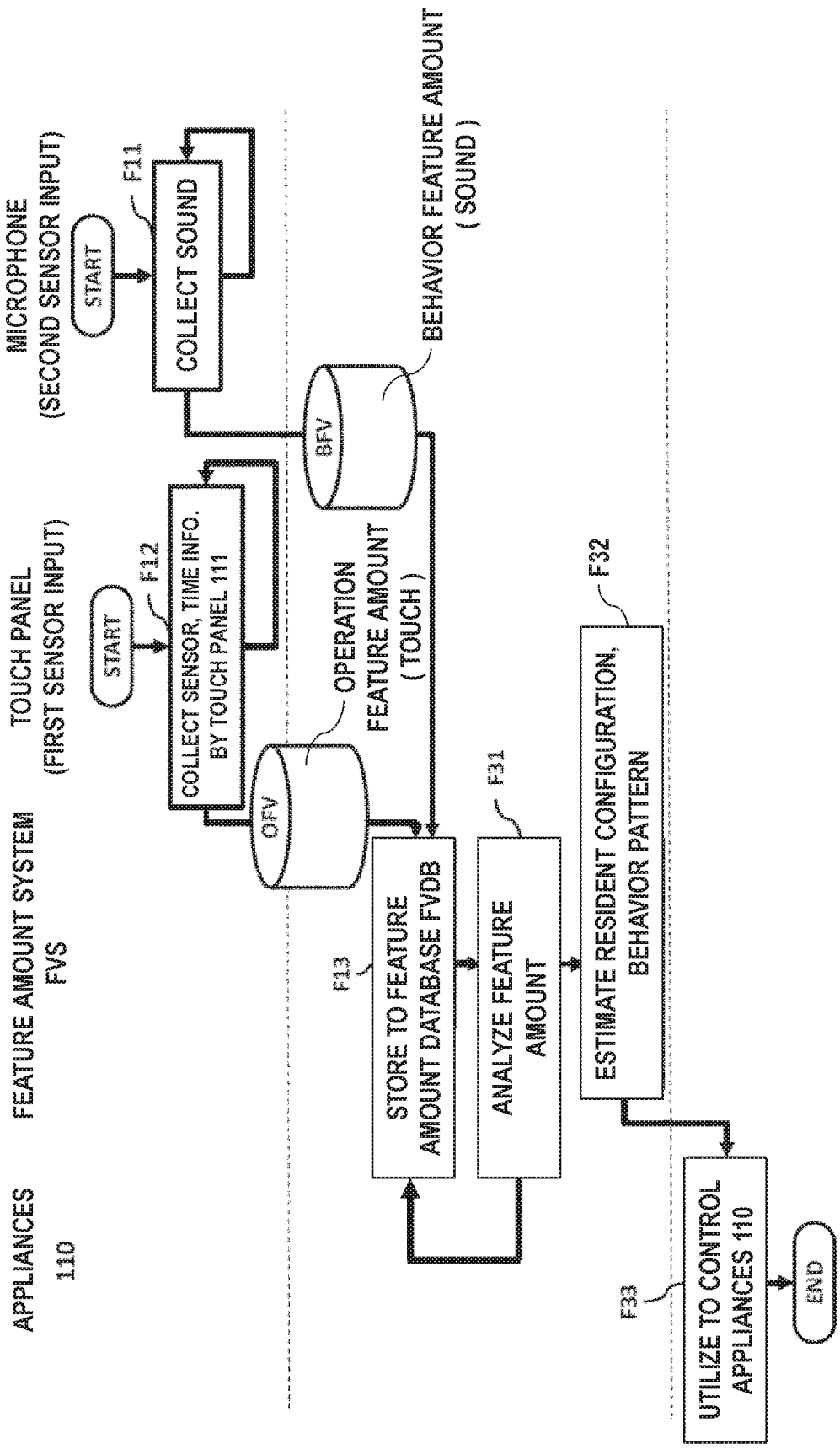
FIG. 20 is a diagram illustrating the estimation flows according to Embodiment 3.

FIG. 20 is a flowchart illustrating an estimation flow according to Embodiment 3. As described in Embodiment 1 and 2, the change of the electrostatic capacitance values, the information of the control command type, the time stamp information thereof, and the information of environmental sounds and the time stamp information thereof are input from the touch panel 111 as the first sensor input and from the microphone 112 as the second sensor input to the feature amount system FVS.

In step F13, the feature amount data is stored in the feature amount database FVDB, and in step F31, the feature amount data is analyzed. The steps F11, F12, F13, and F31 are repeatedly executed, and the information classified as the feature amount database FVDB is accumulated. In step F32, the resident configuration and the behavior pattern are estimated from the accumulated information. As described above, the estimated information is utilized for operation control of the device 110, service provision, and the like in step F33.

According to Embodiment 3, the following effects can be obtained. 1) In the case of a living space in which a plurality of appliances of Embodiment 1 and Embodiment 2 are provided, it is possible to estimate where the individual is located based on the behavior feature amounts of the user from the second sensor (microphone) and the time stamp information thereof. 2) It is possible to estimate the configuration of the resident and the behavior pattern of each individual from the feature amount information and the time stamp information of each of the plurality of devices, and to utilize them for the service in each of the appliances.

Embodiment 4

Figure 21:
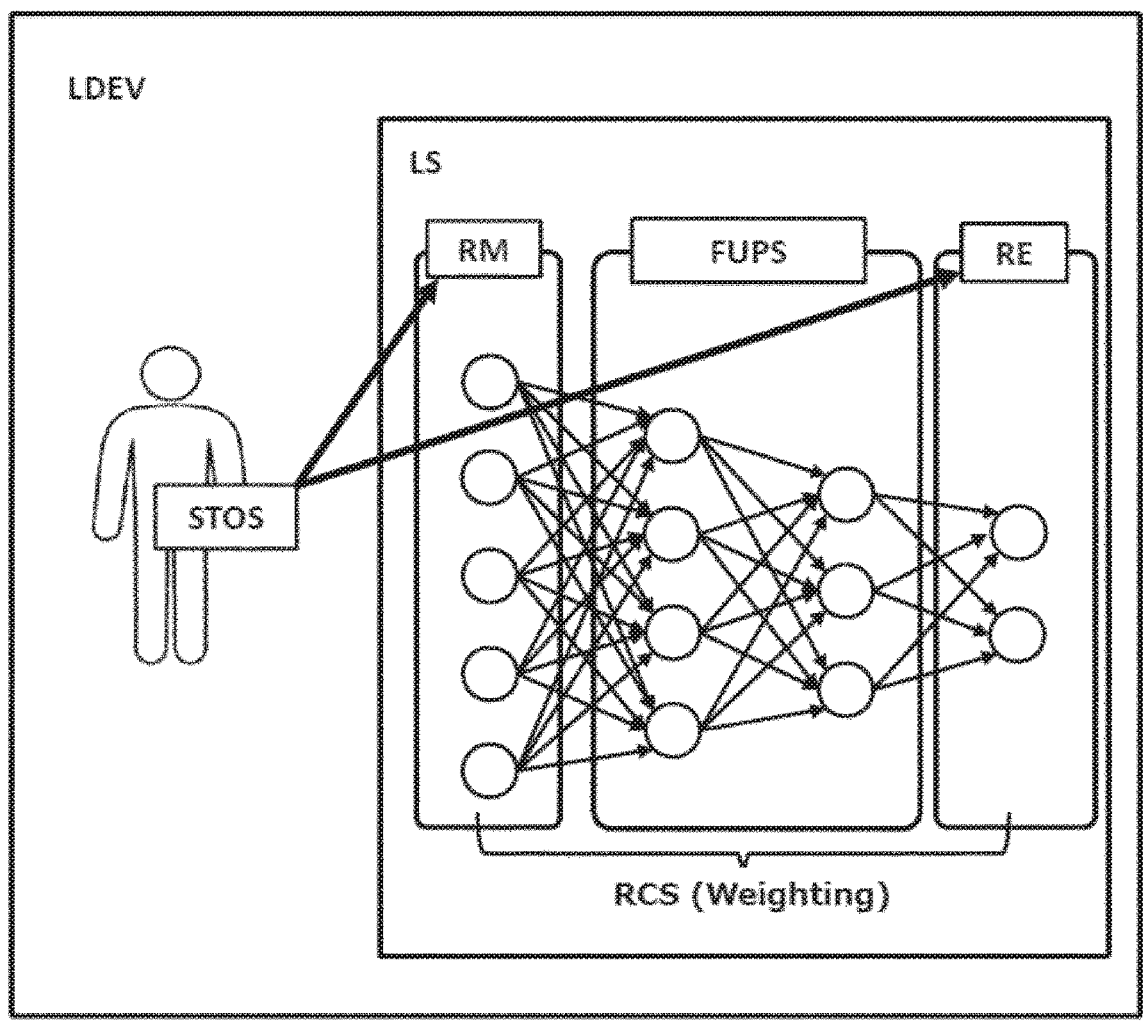
FIG. 21 is a diagram illustrating a conceptual configuration when a change in electrostatic capacitance values according to Embodiment 4 is machine-learned.

As described in Embodiment 1, the electrostatic capacitance values 20 and 20b when the operation panel CP of the appliance 110 is operated differ depending on users. In Embodiment 1, as shown in the distribution diagram of FIG. 7, examples are shown in which a plurality of samples are used in advance to learn tabulation and distribution conditions. In Embodiment 4, a plurality of samples (e.g., three persons) are machine-learned as shown in FIGS. 21 and 22. When learning is performed by samples of a plurality of persons, it is preferable to perform learning a plurality of times per person. By performing learning several times for each sample, it is possible to absorb the habit of pressing due to age, sex, or the like by weighting, and it is possible to tabulate the change of the capacitance value (FFT analysis pattern) with very high accuracy.

Figure 23:
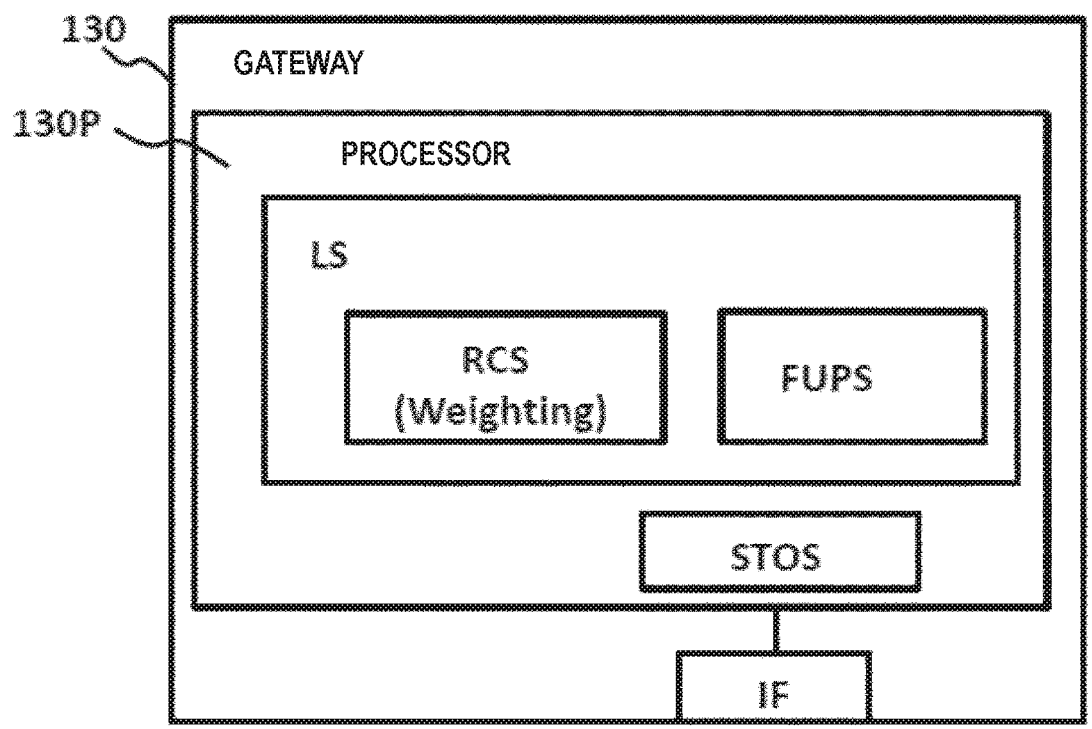
FIG. 23 is a diagram illustrating a configuration example of a gateway for machine-learning.

FIG. 21 is a diagram illustrating a conceptual configuration in the case of machine-learning a change in the electrostatic capacitance value. FIG. 22 is a diagram illustrating the material RM (Raw Material) and the result RE in the machine-learning. FIG. 23 is a diagram illustrating a configuration example of a gateway when machine-learning is performed.

As shown in FIG. 21, the learning device LDEV includes a state observation section STOS (STate Observation Section) and a learning section LS (Learning Section).

The state observation section STOS observes the electrostatic capacitance values 20 (20b) when the operation panel CP of the appliance 110 is operated. The learning section LS includes an input unit of the material RM, a function update section FUPS (Function UPdate Section), an output section of the result RE, and a reward calculation section RCS (Reward Calculation Section). The electrostatic capacitance values 20 and 20b are input from the state observation section STOS to the input unit of the material RM. The function update section FUPS analyzes the material RM, weights the calculation result of the material RM in accordance with the weighting (Weighting) calculated by the reward calculation unit RCS, and outputs the weighted calculation result to the result RE.

As shown in FIG. 22, a case where electrostatic capacitance values 20 and 20b measured by an electrostatic capacitance touch by a user (A, B) as shown in FIGS. 3 and 4 are input as the material RM will be described as an example. In this case, as described above, the electrostatic capacitance value 20 (20b) varies greatly depending on the weight, height, age, sex, and pressing habit of the user. It is considered that the weighting by the reward calculation unit RCS tends to differ depending on the age and sex at which the pressing habit tends to occur, for example. As shown in FIG. 22, in the result RE, the learning result RE1 in the case of "not weighted" may vary. On the other hand, when learning is performed in consideration of the weighting, the variation in the learning result RE2 in the case of "weighted" converges. In FIG. 22, the learning result RE1 and the learning result RE2 are shown when learning is repeated with three samples. In addition, the learning result RE1 and the learning result RE2 are the distributions of the change (FFT-analysis pattern) of the electrostatic capacitance values described in FIG. 6, in which the vertical axis represents the "change in the electrostatic capacitance value due to the pressing strength" and the horizontal axis represents the "change in the electrostatic capacitance value due to the pressing speed".

As shown in FIG. 23, when performing machine-learning, the gateway 130 includes a processor unit 130P and an interface IF. The processor unit 130P includes a learning section LS and a state observation section STOS. The learning section LS includes a reward calculation section RCS and a function update section FUPS. With such a configuration of the gateway 130, it is possible to perform machine-learning of the change in the electrostatic capacitance value, and the change in the electrostatic capacitance value (FFT analysis pattern) can be tabulated with very high accuracy.

The configuration of the gateway 130 of FIG. 23 is also applicable to the gateways 130 of Embodiment 2 and Embodiment 3. As a result, even in Embodiment 2 and Embodiment 3, the change of the electrostatic capacitance values can be tabulated with a very high accuracy by using the machine-learning. When estimating the user, if a table regarding the configuration of the residents in the living space 101 and the behavior patterns thereof as shown in Embodiment 3 is prepared in advance, it is possible to accurately estimate the users as long as the number of the residents is about the same as the number of the families. When the information table is generated, it is possible to prepare an information table with high accuracy in consideration of weighting and the like by using machine-learning.

While the invention made by the present inventor has been specifically described above based on the Embodiment, the present invention is not limited to the above-described embodiment and Embodiment, and it is needless to say that the present invention can be variously modified.

What is claimed is:

1. An appliance comprising:
    a sensor input unit that inputs a plurality of control commands to control operations of the appliance,
    wherein the appliance estimates a user based on a control command type that is a type of the control command, and an operation feature amount when the control command is input to the sensor input unit by the user,
    wherein the sensor input unit comprises a touch panel,
    wherein the touch panel comprises a touch panel of an electrostatic capacitance type, and
    wherein the appliance generates the operation feature amount by a Fast Fourier Transformation of a time-dependent change of an electrostatic capacitance value corresponding to a pressure on the touch panel.

2. The appliance according to claim 1, wherein the operation feature amount includes an analysis pattern of a time-dependent change of an electrostatic capacitance value corresponding to a pressure on the touch panel by a Fast Fourier Transformation.

3. The appliance according to claim 1, wherein the operation feature amount includes an electrostatic capacitance value of the user to ground.

4. The appliance according to claim 1,
    wherein the sensor input unit comprises a first sensor input unit,
    wherein the appliance further comprises a second sensor input unit that collects a behavior feature amount of the user from a time earlier than the first sensor input unit starts to operate, and
    wherein the appliance estimates the user based on the control command type and the operation feature amount from the first sensor input unit and the behavior feature amount collected from the second sensor input unit.

5. The appliance according to claim 4, wherein the operation feature amount includes time information indicating a time at which the first sensor input unit is operated.

6. The appliance according to claim 4,
    wherein the behavior feature amount comprises a first behavior feature amount,
    wherein the control command type comprises a first control command type,
    wherein the operation feature amount comprises a first operation feature amount,
    wherein the user comprises a first user,
    wherein the second sensor input unit collects a second behavior feature amount of a second user that inputs the control command to the first sensor input unit next, and
    wherein the first control command type is guided, before the second user starts to input a second control command to the first sensor input unit, when the first behavior feature amount and the second behavior feature amount are judged to have a predetermined relation.

7. The appliance according to claim 4, wherein the second sensor input unit stops to collect the behavior feature amount after the first sensor unit starts to operate.

8. The appliance according to claim 4,
    wherein the second sensor input unit detects a speed at which the user approaches the appliance, and
    wherein the appliance estimates the user based on the behavior feature amount including information on the speed detected by the second sensor input unit.

9. The appliance according to claim 4,
    wherein the second sensor input unit comprises a microphone, and
    wherein the behavior feature amount includes a sound associated with a behavior of the user.

10. The appliance according to claim 4, wherein the appliance estimates the user using an information table that is generated based on the control command type and the operation feature amount input from the first sensor input unit.

11. The appliance according to claim 10, wherein the information table is generated in consideration of weighting by machine-learning.

12. A user estimation system,
    wherein the appliance according to claim 1 comprises a first appliance,
    wherein the sensor input unit comprises a first sensor input unit,
    wherein the user estimation system comprises:
        the first appliance; and
        a second appliance that comprises a second sensor input unit collecting a behavior feature amount of the user from a time earlier than the first sensor input unit starts to operate, and
    wherein the user estimation system estimates a configuration and a behavior pattern of the user from an estimated result of the user by the first appliance, and the behavior feature amount collected by the second appliance.

13. The user estimation system according to claim 12, further comprising a third appliance that is controlled based on an estimated result of the configuration and the behavior pattern of the user.

14. The user estimation system according to claim 13, wherein the user estimation system estimates the user using an information table that is generated based on the control command type, the operation feature amount, and the behavior feature amount.

15. The user estimation system according to claim 14, wherein the information table is generated in consideration of weighting by machine-learning.

16. An appliance comprising:
    a sensor input unit that inputs a plurality of control commands to control operations of the appliance,
    wherein the appliance estimates a user based on a control command type that is a type of the control command, and an operation feature amount when the control command is input to the sensor input unit by the user,
    wherein the operation feature amount includes an analysis pattern of a time-dependent change of an electrostatic capacitance value corresponding to a pressure on a touch panel of the sensor input unit by a Fast Fourier Transformation, wherein the sensor input unit comprises a first sensor input unit, wherein the appliance further comprises a second sensor input unit that collects a behavior feature amount of the user from a time earlier than the first sensor input unit starts to operate, and wherein the appliance estimates the user based on the control command type and the operation feature amount from the first sensor input unit and the behavior feature amount collected from the second sensor input unit.

17. A user estimation system comprising:

a first appliance comprising a first sensor input unit that inputs a plurality of control commands to control operations of the appliance, wherein the first appliance estimates a user based on i) a control command type that is a type of the control command and ii) an operation feature amount when the control command is input to the sensor input unit by the user; and a second appliance that comprises a second sensor input unit collecting a behavior feature amount of the user from a time earlier than the first sensor input unit starts to operate, wherein the operation feature amount includes an analysis pattern of a time-dependent change of an electrostatic capacitance value corresponding to a pressure on a touch panel of the first sensor input unit by a Fast Fourier Transformation, and wherein the user estimation system estimates a configuration and a behavior pattern of the user from an estimated result of the user by the first appliance, and the behavior feature amount collected by the second appliance.

* * * * *